(12) United States Patent
Chien et al.

(10) Patent No.: US 11,873,914 B2
(45) Date of Patent: *Jan. 16, 2024

(54) BUFFER VALVE

(71) Applicant: BUENO TECHNOLOGY CO., LTD., Tainan (TW)

(72) Inventors: Huan-Jan Chien, Tainan (TW); Po-Wen Chen, Tainan (TW)

(73) Assignee: Bueno Technology Co., Ltd., Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,202

(22) Filed: Oct. 20, 2022

(65) Prior Publication Data

US 2023/0349475 A1 Nov. 2, 2023

Related U.S. Application Data

(63) Continuation-in-part of application No. 17/812,045, filed on Jul. 12, 2022.

(30) Foreign Application Priority Data

Apr. 27, 2022 (TW) .................................. 111116051

(51) Int. Cl.
*F16K 15/18* (2006.01)
*F16K 31/122* (2006.01)

(52) U.S. Cl.
CPC ...... *F16K 15/1843* (2021.08); *F16K 31/1221* (2013.01)

(58) Field of Classification Search
CPC ........................... F16K 31/122; F16K 31/1221
USPC ..................................................... 251/62, 63.5
See application file for complete search history.

(56) References Cited

U.S. PATENT DOCUMENTS

| 7,090,190 B2* | 8/2006 | Yasue | F16K 7/17 |
| | | | 251/285 |
| 2007/0097590 A1* | 5/2007 | Adams | F16K 31/06 |
| | | | 361/160 |
| 2012/0168653 A1* | 7/2012 | Ejiri | F16K 1/305 |
| | | | 251/63.5 |
| 2020/0300383 A1* | 9/2020 | Doi | F16K 1/54 |
| 2022/0275871 A1* | 9/2022 | Ishibashi | F16K 31/365 |

* cited by examiner

*Primary Examiner* — Robert K Arundale
(74) *Attorney, Agent, or Firm* — Rosenberg, Klein & Lee

(57) ABSTRACT

A buffer valve is installed on a pneumatic diaphragm valve. An inner flow channel of the buffer valve includes an inner micro gas hole, an inner chamber, an outer gas hole, and a floating ball. The buffer valve has functions with a high-filling action, a shielding action, a releasing action, a shielding time Δt, and an adjusting mechanism. When inflatable, the floating ball will not block the inner micro hole to be quickly filled with high-pressure gas. when gas discharge, the floating ball will move to the outer gas hole with the gas flow and produce the shielding action to reduce the discharge rate to reduce the vibration and slow down the approach speed of the diaphragm to reduce the impact against the valve seat. When the pressure of the gas decreases, the floating ball is separated from the outer gas hole by the releasing action to accelerate the discharge.

20 Claims, 24 Drawing Sheets

BUFFER VALVE

CROSS-REFERENCE TO RELATED APPLICATIONS

This patent application is a continuation in part of U.S. patent application Ser. No. 17/812,045, filed on Apr. 27, 2022.

FIELD OF THE INVENTION

The present invention relates to a buffer valve, and more particularly to a buffer valve that is a two-way valve installed on a breathing hole of a pneumatic diaphragm valve for conveying high cleanliness fluid. The pneumatic diaphragm valve has a diaphragm and a valve seat. The buffer valve can slow down the opening and closing action of the pneumatic diaphragm valve, so as to reduce the impact of a central portion of the diaphragm against the valve seat and the vibration generated by the rapid release of a high-pressure gas. Such impact and vibration will increase the separation of the material and cause pollution. In recent years, the further pursuit of wafer grinding is that the suspended particles of the conveying fluid will not produce an impinging jet flow due to the closing of the central portion and the valve seat. The rapid release of the high-pressure gas causes the trajectory of suspended particles to be away from the direction of the fluid, resulting in collisions and condensation.

BACKGROUND OF THE INVENTION

A conventional pneumatic diaphragm valve includes a pneumatic cylinder, a diaphragm, and a valve seat. The pneumatic cylinder is divided into a pneumatic chamber and a spring chamber by a piston. The spring chamber is provided with a spring. The spring chamber and the pneumatic chamber each have a breathing hole. The breathing hole of the pneumatic chamber is used for filling a high-pressure gas, and the gas pressure usually ranges from 3 bar to 7 bar. The conventional diaphragm is an integral structure, having a peripheral portion, a central portion and an elastic portion. The cross-sectional shape of the elastic portion is like a Ω-shaped curve having a longer curve length. The arc-shaped curve surrounds an axis to form an annular curve structure with an axis hole. The outer circumference of the elastic portion is connected to the peripheral portion. The periphery of the center is connected to the central portion. The arc-shaped curve has more extension space but a lower tensile ratio. When the central portion is displaced, the arc-shaped curve provides more deformation and extension, so that the central portion has more and faster displacement, and its lower tensile ratio brings longer service life of the diaphragm. The movement of the central portion will pull the elastic portion with a smaller diameter to move, so that the elastic portion can bear less fluid pressure without reducing the leaving speed of the central portion. In another structure of the diaphragm, its elastic portion is a concave spherical structure in the shape of a pot lid, having a shorter curve length and a higher tensile ratio. The curve provides a larger area of deformation and extension to maintain the displacement of the central portion when the central portion is displaced, and its higher tensile ratio brings a slightly shorter service life of the diaphragm. The pneumatic diaphragm valve is classified into a normally closed valve and a normally open valve. The normally closed valve is forced by the elastic force of the spring in the spring chamber so that the central portion is in close contact with the valve seat to keep closed. Taking a 1-inch valve as an example, the pressing force of the spring is 70 kg. The normally open valve is supported by the elastic force of the spring in the spring chamber, so that the central portion is separated from the valve seat to keep open. Taking a 1-inch valve as an example, the tension of the spring is 30 kg. The pneumatic chamber of the normally closed valve is located on the rear side of the diaphragm. The spring chamber of the normally open valve is located on the rear side of the diaphragm. The pneumatic chamber is used for filling a high-pressure gas to push the piston to compress the spring. When the normally closed valve is opened, the central portion has a leaving speed relative to the valve seat. When the normally open valve is closed, the central portion has an approach speed relative to the valve seat. When these two valves perform such actions, the more compressed the spring in the spring chamber, the higher the rebound force. Such a rebound force provides a good buffering effect, and there will not be too much impact. The pneumatic chamber is subjected to a gradually rising pressure to reduce the vibration of the high-pressure gas. At the moment of filling the high-pressure gas, the piston will not move quickly. When the central portion moves away from the valve seat, only a slight negative vacuum is generated. When the high-pressure gas is released, the pressure of the pneumatic chamber drops sharply. There will be vibrations released by the high-pressure gas. In general, the pressure of the exhaust pipe is the atmosphere, and the absolute pressure is 1 bar. Compression ratio of absolute pressure=pressure of high-pressure gas/pressure of the exhaust pipe. When the compression ratio released by the high-pressure gas is >1.5 times, the violent vibration of the ultrasonic wave will be generated. The spring also releases its compressed rebound force to push the piston too fast. For the normally closed valve, the central portion approaches the valve seat fast to impact the valve seat. For the normally open valve, the central portion leaves the valve seat fast to create a brief negative vacuum at the valve seat. For the normally closed valve, the central portion will impact the valve seat at a high approach speed during the process of gas discharge, and the arc-shaped curve of the elastic portion cannot obtain a buffering effect from the fluid pressure. In such a closing process, there is jet flow produced by the water hammer effect. This water hammer effect not only produces jet flow but also transmits pressure waves up and down the pipeline, which will cause damage to other equipment or joints on the pipeline or release of unwanted particles to contaminate clean fluids. For the normally open valve, the central portion will move away from the valve seat at a high speed during the process of gas discharge, and the arc-shaped curve of the elastic portion will move up sharply. The delivery fluid cannot be replenished in a short time, resulting in a short-term negative pressure effect near the valve seat, which causes the fluid in the diaphragm to produce short-term intense turbulent flow and eddy flow. These fluids produce violent phenomena when the valve is opened and closed. In semiconductor process, in addition to the impact of the center portion against the valve seat to generate material particles, the jet flow, turbulent flow and eddy flow also release undesired particles along the pipeline and damage the pipeline and equipment. Liquids containing suspended particles may cause particles to move in directions that are inconsistent with the direction of the fluid, resulting in the problem of particle agglutination due to static electricity generated from collisions.

From the above description, the basic application requirements of the pneumatic diaphragm valve for delivering high cleanliness fluids can be classified into the following two problems:

First Problem: The fluid to be conveyed will not be affected because the central portion is moved toward the valve seat too fast, resulting in the problem of the jet flow produced by water hammer and the problem of the vibration of the pressure wave transmitted to the pipeline upstream and downstream, or the central portion is moved away from the valve seat too fast, resulting in the problem of transient severe turbulent flow and eddy flow.

Second Problem: When the high-pressure gas is discharged through the pneumatic chamber of the diaphragm valve, there will be no violent vibration and no shock wave transmitted to the liquid conveying pipe upstream and downstream.

If these two problems can be solved at the same time, the following first, second and third requirements can be met at the same time because each problem involves needs the first, second and third requirements.

First Requirement: reducing particles being released.

Second Requirement: reducing the damage to the joints and devices on the pipeline, especially reducing the risk of leakage.

Third Requirement: reducing the condensation of suspended particles.

Fourth Requirement: adjusting the opening and closing time of the diaphragm valve.

The third requirement is a new requirement in response to the latest semiconductor process requirements. The fourth requirement is to provide more adjustment requirements for the length of the operation time in different processes when solving the first and second problems.

In the prior art, several references solutions have been proposed for the first and second problems. These reference solutions also hope to meet the first, second, third and fourth requirements. The following are the reference solutions of the prior art.

First Reference

US Patent No. U.S. Pat. No. 5,779,224A titled "poppet valve" published in 1998 aims at a solution to the first problem, hoping to solve the problem of the impact of the central portion against the valve seat. The solution to the problem is to provide a rubber cushion the rear side of the diaphragm. The rubber cushion just protects the diaphragm itself, and does not solve the violent vibration caused by the release of the high-pressure gas that is not slowed down when released. It is unable to solve the second problem. An auxiliary spring with a low elastic force is installed in the pneumatic chamber of the normally closed diaphragm valve, so that the diaphragm can be buffered and closed smoothly when it is closed. This can reduce the impact of the central portion against the valve seat greatly and generate less vibration and release fewer particles, but it does not mention how much the approach speed is reduced by reducing the impact. That is, it is possible that the first problem is not completely solved, and it is impossible to confirm that the problem of the jet flow of the fluid is solved.

Second Reference

US Patent No. U.S. Pat. No. 5,865,423A titled "high flow diaphragm valve" published in 1999 aims at a solution to the first problem. The solution to the problem of jet flow produced by water hammer is proposed. A valve chamber surrounding the valve seat is in the shape of a bowl, and the elastic portion of the matched diaphragm is shaped like a pot lid. The length of the curve of the section is shorter than that of the structure with a Ω-shaped section. The movement of the central portion will pull the elastic portion with a larger diameter area to move. In practice, the valve chamber has a larger outer diameter so that the diaphragm also has a larger diameter to withstand the deformation. In this way, the elastic portion with a larger diameter area can withstand more fluid pressure. When the central portion moves toward the valve seat, the diaphragm will have a relatively large area to withstand the fluid pressure to reduce its approach speed, and the bowl-shaped valve chamber can obtain a larger flow rate when it is opened. US Patent No. U.S. Pat. No. 6,123,320A titled "sanitary diaphragm valve" published in 2000 also has a similar bowl-shaped valve chamber structure. The elastic portion of the diaphragm is also shaped like a pot lid. However, in the test, the approach speed was not significantly reduced and the vibration caused by the release of the high-pressure gas was not significantly reduced, that is, the first problem was not completely solved. The problem of j et flow of the fluid cannot be solved. Secondly, the problem of vibration released by the high-pressure gas has not been solved.

Third Reference

Japanese Patent No. JPH09217845 (A) titled "diaphragm Valve" published in 1999 aims at a solution to the first problem. An auxiliary spring with a lower elastic value is installed in the pneumatic chamber of the normally closed diaphragm valve. The normally closed spring above the piston ensures that the diaphragm can be pressed against the valve seat. The auxiliary spring under the piston allows the diaphragm to be buffered and closed smoothly. This can reduce the impact of the central portion against the valve seat greatly and generate less vibration and release fewer particles, but it does not mention how much the approach speed is reduced by reducing the impact. That is, it is possible that the first problem is not completely solved, and it is impossible to confirm that the problem of the jet flow of the fluid is solved. Secondly, it does not solve the second problem. When the high-pressure gas is released, it will still not be slowed down and will produce violent vibrations.

Fourth Reference

Japanese Patent No. JP2009180338(A) titled "fluid control valve and operation air intermediate valve" published in 2009 introduces a miniature valve mechanism to further improve the problem. The miniature valve mechanism has a micro gas hole, a miniature piston, a miniature spring, a miniature sealing surface and a miniature fixing seat. The miniature piston has a miniature flange on the open side of the miniature fixing seat. The miniature spring is mounted on the outer surface of the miniature piston, and is restricted to the inner side of the miniature fixing seat by the miniature flange. Part of the miniature piston is exposed to the outlet of the miniature fixing seat. The miniature piston can be sealed with the miniature sealing surface. The miniature sealing surface is installed on the inner side of the breathing hole in the pneumatic chamber. The miniature gas hole is disposed on the miniature piston, enabling the miniature piston to communicate with the exterior space of the miniature fixing seat. The miniature fixing seat has a through hole communicating with the pneumatic chamber.

In the first embodiment, the miniature fixing seat is installed on the piston and is located on one side of the pneumatic chamber and can move up and down along with the piston. When the piston is at the position where the valve is opened, the miniature valve mechanism moves along with the piston to the position where the valve is opened and does not cover the breathing hole, and the open surface of the fixing seat is in contact with the inner surface of the pneumatic chamber located at the side of the valve seat, and the miniature piston completely seals the miniature sealing surface and the breathing hole. When the piston is at the position where the valve is closed, the breathing hole is to be filled with a high-pressure gas to open the valve. At this time, the high-pressure gas first passes through the micro gas hole of the miniature piston and is restricted in the gas flow. As the pressure of the pneumatic chamber gradually increases, the piston moves toward the spring chamber and compresses the spring. At this time, the miniature valve mechanism also moves and allows the breathing hole to accelerate the filling of the gas. When the valve is at the open position, the pneumatic chamber is completely filled with the high-pressure gas, and the piston fully compresses the spring of the spring chamber. When the valve is switched to be closed, the miniature valve mechanism will gradually cover the breathing hole when it is close to the miniature sealing surface until the breathing hole is completely covered. At first, the release of the high-pressure gas is not affected by the miniature mechanism until the breathing hole is gradually covered, the miniature gas hole will restrict the flow of the released residual high-pressure gas.

In the second embodiment, the miniature valve mechanism is installed inside the breathing hole of the pneumatic chamber and is driven by the opening and closing actions of the valve. When the piston is at the position where the valve is opened, the miniature spring of the miniature valve mechanism lifts the miniature piston without covering the breathing hole. When the valve is switched to be closed, the high-pressure gas will first flow through the ventilation hole to enter the fixing seat and then to enter the breathing hole. At this time, the gas flow is released in an unrestricted manner. When the central portion is close to the valve seat, the surface of the piston will contact and press the miniature piston to move until it contacts and seals the sealing surface. At this time, the gas flow is released in a restricted manner.

In the above two embodiments, first, the piston moves at a normal speed and an accelerated speed. When the breathing hole is gradually covered, the piston is no longer accelerated but gradually decelerated. But, the elastic force of the spring continues to act plus the momentum of the piston. At the position where the valve is closed, the central portion of the diaphragm still impacts the valve seat. This still does not solve the first problem, namely, the problem of water hammer and jet flow between the central portion and the valve seat. When the pneumatic chamber releases the high-pressure gas at the initial stage, the high-pressure gas will directly flow out of the breathing hole. At this time, there will be violent vibration from the release of the gas. Until the breathing hole is gradually covered, it no longer produces violent vibration. Such a high-pressure gas release process still does not solve the second problem, namely, the problem of violent vibration caused by the high-pressure gas. The miniature valve mechanism is linked with the opening and closing mechanism and lacks room for adjustment and improvement of the stroke. Basically, it cannot meet the fourth requirement. The opening and closing time of the diaphragm valve must meet the requirements.

Fifth Reference

Taiwanese Patent No. TW202010966A titled "diaphragm valve structure" published in 2020 aims at a solution to the first problem and the second problem. This diaphragm valve structure is applied to diaphragm valves made of perfluoro resin at 200° C. Regarding the non-particle release structure, it is mentioned that the piston includes an annular portion, a lower annular rib, an upper annular rib, and a damping ring. The upper valve body is mounted on the inner side of the annular portion, and has an open cup-shaped structure with a central conical protrusion, and includes an outer annular surface, a pressing portion, a shaft hole portion, a first annular groove, a second annular groove, and a diaphragm chamber. The damping ring is coupled with the first annular groove. The damping ring is in sliding fit with the first annular groove. When the diaphragm moves up and down, it can provide a damping effect to absorb shock. The lower annular rib is coupled with the second annular groove. The lower annular rib is in sliding fit with the second annular groove. When the diaphragm moves up and down, it can provide a damping effect to absorb shock. This is to slow down the release of the gas to achieve shock absorption. However, because the method is achieved through structural conditions, it is impossible to further adjust the conditions for shock absorption according to the demand. It is impossible to meet the fourth requirement. The opening and closing time of the diaphragm valve must meet the requirements, and variation in structural and dimensional tolerances may affect the control of releasing the gas.

Sixth Reference

Taiwanese Patent No. TW202045845 titled "fluid control valve" published in 2020 aims at a solution to the first problem and the second problem. The method of this reference is similar to that of the fourth reference but slightly different. The fluid control valve has a pneumatic cylinder, and the pneumatic cylinder is divided into a pneumatic chamber and a spring chamber by a piston. The spring chamber is provided with a spring. The spring chamber and the pneumatic chamber each have a breathing hole. The breathing hole of the pneumatic chamber is used for filling a high-pressure gas. When the piston is at the position where the valve is opened, the fluid is received in the pneumatic chamber. The fluid is discharged through the breathing orifice as the piston is displaced toward the position where the valve is closed.

In the first embodiment, a throttling portion is disposed on one side of the pneumatic chamber and can move up and down along with the piston. The throttling portion may be an annular structure. A throttling flow path with a flow path cross-sectional area less than that of the breathing hole is formed between the throttling portion and the inner wall of the pneumatic pressure, or a flow restricting portion has a flow restricting slit. When the piston is at the position where the valve is opened, the throttling portion does not cover the breathing hole. When the piston is at the position where the valve is closed, the throttling portion completely covers the breathing hole. When the piston is at the position where the valve is closed, the breathing hole is to be filled with a high-pressure gas to open the valve. At this time, the high-pressure gas first passes through the restricting flow channel and is restricted in the gas flow. As the pressure of the pneumatic chamber gradually increases, the piston moves toward the spring chamber and compresses the spring. At this time, the restricting flow channel also moves to expose the breathing hole with a larger cross-sectional area of the flow path to accelerate the filling of the gas. When the valve is at the open position, the pneumatic chamber is completely filled with the high-pressure gas, and the piston fully compresses the spring of the spring chamber. When the valve is switched to be closed, the throttling portion will gradually cover the breathing hole until it is completely covered. At first, the release of the high-pressure gas is not affected by the flow restricting portion until the breathing hole is gradually covered, the flow restricting portion will restrict the flow of the released high-pressure gas. That is, the piston moves at a normal speed and an accelerated speed. When the breathing hole is gradually covered, the piston is no longer accelerated but gradually decelerated. But, the elastic force of the spring continues to act plus the momentum of the piston. At the position where the valve is closed, the central portion of the diaphragm still impacts the valve seat. This still does not solve the first problem, namely, the problem of water hammer and jet flow between the central portion and the valve seat. When the pneumatic chamber releases the high-pressure gas at the initial stage, the high-pressure gas will first flow through the breathing hole that is not covered by the flow restricting slit. At this time, there will be violent vibration from the release of the gas. Until the breathing hole is gradually covered by the flow restricting portion, it no longer produces violent vibration. Such a high-pressure gas release process still does not solve the second problem, namely, the problem of violent vibration caused by the high-pressure gas. Both the flow restricting slit and the restricting flow channel are formed through a gap or slit in a fixed structure, which lacks room for adjustment and improvement. Basically, it cannot meet the fourth requirement. The opening and closing time of the diaphragm valve must meet the requirements. The throttling portion of the first embodiment may be applied to a normally open valve. The throttling portion is disposed in the spring chamber. When the pneumatic chamber is filled with the high-pressure gas, the gas in the spring chamber is restricted to flow out slowly, so that the central portion of the diaphragm approaches the valve seat at a low speed. However, because the pressure of the spring chamber is only one atmosphere, scarce air quality is not easy to have a good result. In general, the buffering effect of the pneumatic chamber filled with the high-pressure gas is still borne by the spring. Secondly, when the high-pressure gas in the pneumatic chamber is released to open the valve, the vibration generated by the rapid release of the high-pressure gas cannot solve the second problem. The spring pushes the piston so that the central portion is removed at a high speed, resulting in short-term negative pressure, turbulent flow and eddy flow near the valve seat. This is not an appropriate solution to the first and second problems. This reference also uses a structural means, so it is difficult to meet the fourth requirement, and variation in structural and dimensional tolerances may affect the control of releasing the gas.

From the analysis of the above six references, it can be seen that there is no solution to the first problem and the second problem. In the first reference and the third reference, the spring is installed in the pneumatic chamber, which can buffer the impact of the central portion against the valve seat. However, it cannot overcome the vibration when the high-pressure gas is released from the pneumatic chamber, and there is a need for an adjustable mechanism to complete the fourth requirement. In the fourth reference, the fifth reference and the sixth reference, the actions of opening and closing the valve are linked. When the high-pressure gas in the pneumatic chamber is not released, the spring of the spring chamber has the maximum compression. Taking a 1-inch valve as an example, the compression force is up to 70 kg and the gas pressure is above 5 bar. When the high-pressure gas in the pneumatic chamber is to be released, the high-pressure gas will be released in an unrestricted manner to generate the maximum gas vibration. When the ratio of the internal high pressure to the air pressure of the external pipeline is greater than 1.5, there will be ultrasonic detonation, and the spring energy accumulated by the spring will be released at the same time. At this time, the elastic force of the spring will push the piston to move at the highest speed, and the diaphragm valve is subject to a lot of vibration. When the central portion is close to the valve seat, the piston will decelerate sharply because of the air buffering effect from the restricted flow of the exhaust gas. But, the whole valve body still needs to bear the vibration of deceleration. At this time, the air cushion deceleration function hopes to provide the function of shock absorption. In the whole process, the gas is released and the spring accelerates to generate the maximum vibration, and shock absorption is achieved only when decelerating. In this way, the function of shock absorption in the whole process cannot be achieved. Therefore, the first and second problems cannot be completely solved, and the fourth requirement cannot be met.

The fourth reference has introduced a miniature valve mechanism, but it does not improve the above problems and lacks the adjustment of the opening and closing time of the diaphragm valve, namely, the fourth requirement. The above references cannot meet the requirement for vibration control of the normally closed valve that is switched from the open state to the closed state. That is, it is impossible to solve the first and second problems and meet the first, second, third, and fourth requirements.

In the process from the closed state to the open state of the normally open valve, when the high-pressure gas is released from the pneumatic chamber, there will be severe ultrasonic vibration at the moment of release.

The fourth reference doesn't mention whether the miniature valve mechanism can smoothly release the high-pressure gas of the normally closed valve and the normally open valve to immediately relieve such a situation and slow down the release of the elastic force of the spring and continue to discharge the gas. It is impossible to meet such a requirement. It is also impossible to ensure that the central portion of the normally open valve is moved at a reasonable speed away from the valve seat to slow down the turbulent flow, backflow and negative pressure generated near the valve seat. It is also impossible to ensure that the central portion of the normally closed valve is moved at a reasonable speed to approach the valve seat to slow down the jet generated near the valve seat. It is also questionable whether the residual gas can be discharged quickly when the pressure is reduced for the valve to be closed smoothly to short the whole stroke.

From the above description, the miniature valve mechanism needs to solve the following problems in the whole process from the open state to the closed state of the valve or in the whole process from the closed state to the open state of the valve.

Third Problem: When the high-pressure gas is released, it should react immediately to slow down the release of the high-pressure gas and slow down the extension of the spring in the spring chamber.

Fourth Problem: When the pressure of the high-pressure gas decreases, the residual gas in the pneumatic chamber can be discharged quickly.

Fifth Problem: When the pneumatic chamber is to be filled with the high-pressure gas, the speed of gas filling is not affected.

The miniature valve mechanism set forth in the fourth reference is very similar to a common check valve with a spring mechanism, including a valve structure that can move a ball or a miniature piston or a spring, etc. In general, this mechanism is a ball check valve. In the prior art, there are many floating ball check valves developed on the market. The following are the references of the prior art:

Seventh Reference

European Patent No. EP0192474A2 titled "a valve" published in 1986 relates to a check valve for engine gas fuel pipeline. It is a one-way valve, including a control ball, a valve chamber, an inlet pipe, an outlet pipe, a valve seat and a ball seat. The valve chamber communicates with the inlet and the outlet. The main control element is a metal control ball installed in the valve chamber. The ball seat is installed in a cavity of the valve chamber for accommodating the control ball. When the fuel is delivered at a normal flow rate, it will flow through one side of the control ball in the valve chamber, and the control ball will be suspended in the valve chamber under the influence of the flow rate. In the first embodiment, the valve seat is installed at the inlet on the inner side wall of the valve chamber. The inside of the outlet pipe in the valve chamber is provided with a protrusion so that the ball does not obstruct the delivery of gaseous fuel. When the gas fuel delivery pipeline is ruptured, the high-pressure gas fuel flowing back from the engine to the check valve presses the control ball against the valve seat to seal and close the check valve. In the second embodiment, the valve seat is installed at the inlet on the inner side wall of the valve chamber. When the flow rate of the gas fuel exceeds 1.5 times the normal value, the control ball will be pressed on the valve seat to seal and close the check valve. In this reference, the control ball closes the check valve only when the flow rate of the gas fuel exceeds the normal value, and it is not mentioned that the control ball will automatically fall under a certain compression ratio. It cannot solve the third and fourth problems. The control ball of this reference can float freely, which can be used as a two-way valve for rapid filling and can solve the fifth problem.

Eighth Reference

U.S. Patent No. U.S. Pat. No. 4,120,315A titled "velocity check valve" published in 1978 relates to a velocity check valve for oil or gas wells, used to prevent leakage loss and fire loss, comprising a control ball, a valve chamber, an inlet, an outlet, an annular valve seat, a handle push rod and a ball seat. The valve chamber communicates with the inlet and the outlet. The main control element is a metal control ball installed in the valve chamber. The ball seat is installed in the valve chamber for accommodating the control ball. When the fuel is delivered at a normal flow rate, the control ball will be suspended in the valve chamber under the influence of the flow rate. When the flow exceeds, the control ball will close the velocity check valve. At this time, the control ball establishes a pressure differential between the inlet and the outlet. When such a pressure differential is gradually reduced to near zero, the control ball will automatically drop. If the pressure difference does not change, the handle push rod can be used to push the control valve to open the velocity check valve. In this reference, the control ball closes the check valve only when the flow exceeds the normal value. When the pressure differential of the control ball is gradually reduced to near zero, the control ball will automatically drop. It cannot solve the third and fourth problems. The control ball of this reference can float freely, which can be used as a two-way valve for rapid filling and can solve the fifth problem.

When the miniature mechanism is introduced to solve the first and second problems, the miniature mechanism itself needs to further overcome the third, fourth, and fifth problems. The fifth problem can be solved easily. However, the fourth, fifth and sixth references do not have a good solution to the fifth question. The first, second, third, fourth, fifth, sixth, seventh, eighth references do not have a good solution to the third and fourth questions. That is to say, there is no good solution to the first to fifth problems. The miniature valve mechanism needs to be further improved, so as to meet the first to fourth requirements, thereby achieving the unique requirements of clean fluid and particle suspension fluid delivery. The present invention relates to a buffer valve, which belongs to an innovative structure of a miniature mechanism similar to a ball check valve. The present invention can provide solutions to the first to fifth problems and meet the first to fourth requirements.

SUMMARY OF THE INVENTION

A buffer valve is a two-way valve. The buffer valve is installed on a pneumatic diaphragm valve. The pneumatic diaphragm valve includes a pneumatic cylinder, a diaphragm and a valve seat. The pneumatic cylinder is divided into a pneumatic chamber and a spring chamber by a piston. A spring is disposed in the spring chamber. The pneumatic chamber and the spring chamber each have a breathing hole. The breathing hole of the pneumatic chamber is installed with the buffer valve. The buffer valve is provided with a gas connector for filling a high-pressure gas. The buffer valve is configured to adjust release of the high-pressure gas in the pneumatic chamber without affecting a filling speed of the high-pressure gas in the pneumatic chamber. The buffer valve has a tool part located on an outside of the buffer valve for mounting or demounting the buffer valve and for mounting the gas connector. The diaphragm is an integral structure, and has a circumferential portion, a central portion and an elastic portion. The elastic portion has a Ω-shaped cross section with an arc-shaped curve.

For a normally closed valve, when the high-pressure gas is released, the buffer valve can slow down a pressure shock wave generated by the release of the high-pressure gas and violent impact of the central portion of the diaphragm against the valve seat within a period of time, and an approach speed of the central portion of the diaphragm toward the valve seat is reduced to reduce intense jet flow generated by the valve seat when it is closed.

For a normally open valve, when the high-pressure gas is released, the buffer valve can slow down a pressure shock wave generated by the release of the high-pressure gas and an instantaneous leaving speed of the central portion of the diaphragm away from the valve seat within a period of time, so as to slow down generation of local negative pressure and reduce generation of intense eddy flow and intense turbulent flow.

An inner flow channel of the buffer valve includes an inner micro gas hole, an inner chamber, an outer gas hole, and a floating ball. The inner flow channel is selectively in communication with the internal pneumatic chamber or the gas connector of an external high-pressure gas source. The long cylindrical inner chamber has an axis, an inner annular surface, an inner end, and an outer end. The inner end communicates with the pneumatic chamber through the inner micro gas hole. The inner micro gas hole is disposed at a position deviating from the axis of the inner chamber and close to the inner annular surface. The outer end of the inner chamber communicates with the gas connector through the outer gas hole. The outer gas hole is located on the axis of the inner chamber. The floating ball is disposed in the inner chamber and floats along with the high-pressure gas. The floating ball has an outer diameter d1 less than an inner diameter D2 of the inner chamber, d1<D2.

The buffer valve has the following functions in operation, including a high-filling action, a shielding action, a releasing action (including a releasing mechanism), a shielding time Δt, and an adjusting mechanism.

The high-filling action is that when the pneumatic chamber is filled with the high-pressure gas, the high-pressure gas enters the inner chamber through the outer gas hole from a high-pressure pipeline and pushes the floating ball to move toward the inner micro gas hole, without covering the inner micro gas hole, allowing the high-pressure gas to enter the pneumatic chamber to have the high-filling action.

The shielding action is that when the high-pressure gas is released from the pneumatic chamber, the high-pressure gas passes through the inner micro gas hole to enter the inner chamber and drives the floating ball to move toward the outer gas hole to cover the outer gas hole to slow down the release of high-pressure gas. The shielding action is caused by an opening of the floating ball and an inner diameter d3 of the outer gas hole to form a circular contact line C. The circular contact line C cannot achieve an airtightness effect but reduces the speed of gas leakage. The shielding action is caused by a pressure difference ΔP between a gas pressure and a pipeline pressure to generate a pressing force Fp on the floating ball. The pressing force Fp is equal to the pressure difference ΔP multiplied by a circular area of the circular contact line C. In order to ensure the slow degassing, the outer end of the inner chamber may also be provided with a micro gas hole to communicate with the gas connector, and the cross-sectional area of the micro gas hole is not greater than 50% of the cross-sectional area of the inner micro gas hole.

The releasing action is that when the high-pressure gas is continuously released under the shielding action, after the gas pressure is reduced, the releasing action is to release the pressing force Fp through the releasing mechanism, so that the floating ball is displaced and no longer covers the outer gas hole, and the residual high-pressure gas is discharged quickly. The releasing mechanism is a mechanism using at least one of a weight W of the floating ball, an elastic force Fs and a magnetic force Fm to resist the pressing force Fp and move the floating ball to complete the releasing action.

The shielding time Δt is a period from the generation of the shielding action to the completion of the releasing action. In the process from an open state to a closed state of the normally closed valve and in the process from the closed state to the open state of the normally open valve, the period of time is that when the high-pressure gas is released, the shielding time Δt of the buffer valve is to slow down the pressure shock wave generated by the release of the high-pressure gas in the whole process. The approach speed of the central portion of the diaphragm of the normally closed valve toward the valve seat is reduced in the whole process to reduce impact and to reduce intense jet flow generated by the valve seat when it is closed. The leaving speed of the central portion of the diaphragm of the normally open valve away from the valve seat is reduced in the whole process to slow down generation of local negative pressure and reduce generation of intense eddy flow and intense turbulent flow.

The adjusting mechanism is that the length of the shielding time Δt is adjusted through the weight W of the floating ball, the elastic force Fs and the magnetic force Fm of the releasing action.

A straight line L1 is defined from the circular contact line C to the center of the floating ball. A straight line L2 is defined from the center of the floating ball to the center of the inner diameter d3 of the outer gas hole. An included angle θ is defined between the straight line L1 and the straight line L2. That is, the center of the floating ball 23 is connected to the circular contact line C to form a cone angle 2θ. The circular contact line is a narrow annular band structure, for example, a chamfer is formed at the opening of the inner diameter d3 of the outer gas hole. When the outer diameter d1 of the floating ball is less than the inner diameter d3 of the outer gas hole, d1<d3, the area of the circular contact line C is equal to the cross-sectional area of the outer diameter of the floating ball. The annular area of a gap between the outer diameter d1 and the inner diameter d3 is not greater than 50% of the cross-sectional area of the inner micro gas hole to achieve slow degassing. The length of the shielding time Δt of the shielding action is proportional to the pressing force Fp. The length of the shielding time Δt of the shielding action is proportional to the size of the cone angle 2θ.

When the releasing mechanism uses the weight W of the floating ball, the shielding action is that when the weight W of the floating ball cannot resist the pressing force Fp, the floating ball is secured to the outer gas hole, and the releasing mechanism is that when the pressing force Fp generated by the pressure difference ΔP cannot resist the weight W of the floating ball, the floating ball is displaced to the inner chamber and no longer covers the outer gas hole.

When the releasing mechanism uses the elastic force Fs, the shielding action is that when the elastic force Fs borne by the floating ball cannot resist the pressing force Fp, the floating ball is secured to the outer gas hole, and the releasing mechanism is that when the pressing force Fp generated by the pressure difference ΔP cannot resist the elastic force Fs borne by the floating ball, the floating ball is displaced to the inner chamber and no longer covers the outer gas hole.

When the releasing mechanism uses the magnetic force Fm, the shielding action is that when the magnetic force Fm borne by the floating ball cannot resist the pressing force Fp, the floating ball is secured to the outer gas hole, and the releasing mechanism is that when the pressing force Fp generated by the pressure difference ΔP cannot resist the magnetic force Fm borne by the floating ball, the floating ball is displaced to the inner chamber and no longer covers the outer gas hole.

First Embodiment

This embodiment is further described according to the summary of the invention. The buffer valve includes a miniature valve body, the breathing hole and the floating ball. The miniature valve body has a cylindrical shape and includes the inner chamber, an outer chamber, a partition portion, and the outer gas hole. The outer chamber is configured to install the gas connector. The breathing hole includes an inner accommodating chamber and the inner micro gas hole. The breathing hole is disposed on an outer ring wall of the pneumatic chamber. The inner micro gas hole is disposed at a position where the inner accommodating chamber deviates from the axis of the inner chamber and is close to the inner annular surface. An outer ring surface of the miniature valve body is coupled and sealed with the inner accommodating chamber of the breathing hole. The partition portion is located in the middle of the miniature valve body to separate the inner chamber and the outer chamber at two ends. The partition portion has the outer gas hole to communicate with the inner chamber and the outer chamber. The outer gas hole is located on the axis.

Second Embodiment

This embodiment is further described according to the summary of the invention. The buffer valve includes a miniature valve body, a breathing cover and the floating ball. The miniature valve body has a cylindrical shape and includes the inner chamber, an outer chamber, a partition portion, and the outer gas hole. The breathing cover is configured to connect the breathing hole and includes an inner accommodating chamber, the inner micro gas hole, and an external thread. An external thread of the breathing cover is coupled and sealed with the breathing hole. The inner micro gas hole is located on the breathing cover at a position where the inner accommodating chamber deviates from the axis of the inner chamber and is close to the inner annular surface to communicate with the breathing hole. An outer ring surface of the miniature valve body is coupled and sealed with the inner accommodating chamber of the breathing cover. The outer chamber is configured to install the gas connector. The partition portion is located in the middle of the miniature valve body to separate the inner chamber and the outer chamber at two ends. The partition portion has the outer gas hole to communicate with the inner chamber and the outer chamber. The outer gas hole is located on the axis.

As described in the first embodiment and the second embodiment, the shielding action is that when the weight W of the floating ball cannot resist the pressing force Fp, the floating ball is secured to the outer gas hole. As described in the first embodiment and the second embodiment, the releasing action and the releasing mechanism are that when the weight W of the floating ball exceeds the pressing force Fp generated by the pressure difference ΔP, the floating ball is displaced to the inner chamber and no longer covers the outer gas hole.

As described in the first embodiment and the second embodiment, the releasing action is reliably completed due to the ratio of the outer diameter d1 of the floating ball to the inner diameter D2 of the inner chamber, d1/D2≤0.6. As described in the first embodiment and the second embodiment, the outer diameter d1 of the floating ball is greater than the outer diameter d3 of the outer gas hole, and the cone angle 2θ, 10°≤θ≤60°.

As described in the first embodiment and the second embodiment, the adjusting mechanism is configured to adjust parameters including the weight W and the outer diameter d1 of the floating ball and the cone angle 2θ.

Third Embodiment

This embodiment is further described according to the summary of the invention. The buffer valve includes a miniature valve body, the breathing hole, the floating ball, a releasing mechanism, a retaining ring, and an adapter. The miniature valve body has a cylindrical shape and includes the inner chamber, a connecting chamber, a partition portion, and the outer gas hole. The breathing hole includes the inner accommodating chamber and the inner micro gas hole. The breathing hole is disposed on an outer ring wall of the pneumatic chamber. An outer ring surface of the miniature valve body is coupled and sealed with the inner accommodating chamber of the breathing hole. The inner micro gas hole is disposed at a position where the inner accommodating chamber deviates from the axis of the inner chamber and is close to the inner annular surface. The partition portion is disposed between the inner chamber and the connecting chamber. The partition portion has the outer gas hole to communicate with the connecting chamber and the inner chamber. The outer gas hole is located on the axis. An inner diameter of the connecting chamber is greater than that of the inner chamber. The retaining ring and the adapter are secured in an airtightness manner. The adapter is installed at an open end of the connecting chamber and is located outside the retaining ring. The adapter is configured to connect the gas connector and the high-pressure pipeline and communicates with the pneumatic chamber. The retaining ring has a cylindrical shape and includes a shaft hole and at least one ventilation hole. The retaining ring is secured to a bottom of the connecting chamber and pressed against the partition portion. The shaft hole has an inner diameter less than that of the outer gas hole. The ventilation hole is in communication with the outer gas hole. The releasing mechanism includes an adjusting shaft, the retaining ring, a retaining nut set, and a miniature spring. The adjusting shaft includes an external thread, a ball seat, and a shaft. The disc-shaped ball seat is located at one end of the adjusting shaft and has a concave spherical surface. The external thread is located at another end of the adjusting shaft. In assembly, the retaining ring is firstly locked inside the connecting chamber. The adjusting shaft is inserted in the miniature spring with its tail end passing through the outer gas hole and the shaft hole from the side of the inner chamber, so that the external thread is located in the connecting chamber to keep the ball seat at the side of the inner chamber. The miniature spring is sleeved on the shaft and pressed between the ball seat and the retaining ring. The inner diameter of the outer gas hole is greater than an outer diameter of the ball seat, so that the adjusting shaft can move back and forth in the inner chamber and the outer gas hole freely. The shaft is in sliding fit with the shaft hole to support the adjusting shaft. The external thread of the adjusting shaft extends out of the shaft hole. The retaining nut set is disposed on the external thread to ensure that the adjusting shaft will not be loosened from the retaining ring when the high-pressure gas is filled.

Fourth Embodiment

This embodiment is further described according to the summary of the invention. The buffer valve includes a miniature valve body, the breathing hole, the floating ball, a releasing mechanism, a retaining ring, a slide sleeve, and an adapter. The miniature valve body has a cylindrical shape and includes the inner chamber, a connecting chamber, a partition portion, and the outer gas hole. The breathing hole includes an inner accommodating chamber and the inner micro gas hole. The breathing hole is disposed on an outer ring wall of the pneumatic chamber. An outer ring surface of the miniature valve body is coupled and sealed with the inner accommodating chamber of the breathing hole. The inner micro gas hole is disposed at a position where the inner accommodating chamber deviates from the axis of the inner chamber and is close to the inner annular surface. The partition portion is disposed between the inner chamber and the connecting chamber. The partition portion has the outer gas hole to communicate with the outer chamber and the connecting chamber. An inner diameter of the connecting chamber is greater than that of the inner chamber. The retaining ring and the adapter are secured in an airtightness manner. The adapter is installed at an open end of the connecting chamber and is located outside the retaining ring. The adapter is configured to connect the gas connector and the high-pressure pipeline and communicates with the pneumatic chamber. The retaining ring has a cylindrical shape and includes at least one ventilation hole and a central screw hole. The retaining ring is secured to a bottom of the connecting chamber and pressed against the partition portion. The central screw hole has an inner diameter less than that of the outer gas hole, and is in communication with the outer gas hole. The releasing mechanism has an adjusting shaft, the slide sleeve, the retaining ring, a locking nut, the retaining nut set, and a miniature spring. The adjusting shaft includes an external thread, a ball seat, and a shaft. The disc-shaped ball seat is located at one end of the adjusting shaft and has a concave spherical surface. The external thread is located at another end of the adjusting shaft. The slide sleeve includes a slide shaft hole, an adjusting disc, and an external thread. In assembly, the retaining ring is firstly locked inside the connecting chamber. The locking nut is fitted on the external thread of the slide sleeve and screwed to the position of the adjusting disc. The external thread of the slide sleeve is coupled with the central screw hole of the retaining ring. The adjusting shaft is inserted in the miniature spring with its tail end to pass through the outer gas hole and the slide shaft hole from the side of the inner chamber, so that the external thread is located in the connecting chamber to keep the ball seat at the side of the inner chamber. An outer diameter of the external thread of the slide sleeve is greater than an outer diameter of the miniature spring. The miniature spring is sleeved on the shaft and pressed between the ball seat and the slide sleeve. The inner diameter of the outer gas hole is greater than an outer diameter of the ball seat, so that the adjusting shaft can move back and forth in the inner chamber and the outer gas hole freely. The shaft is in sliding fit with the slide shaft hole to support the adjusting shaft. The adjusting disc of the slide sleeve is rotated to move forward or rearward and is secured by the locking nut. The position of the miniature spring is linked with the position of the slide sleeve to change a compression displacement $\Delta X$. The external thread of the adjusting shaft extends out of the slide shaft hole of the slide sleeve. The retaining nut set is disposed on the external thread to ensure that the adjusting shaft will not be loosened from the slide sleeve when the high-pressure gas is filled. The position of the slide sleeve is adjusted to fine-tune the compression displacement $\Delta X$ of the miniature spring to change the elastic force Fs. When the value of the elastic coefficient K of the miniature spring is fixed and the outer diameter d1 and weight W of the floating ball are also fixed, the elastic force Fs can be changed to adjust the length of the shielding time $\Delta t$.

As described in the third embodiment and the fourth embodiment, the shielding action is that when the high-pressure gas brings the floating ball to be attached to the ball seat, a pressing force Fp generated by the pressure difference $\Delta P$ generated by the high-pressure gas is applied to the floating ball. The miniature spring is pushed back by the ball seat to generate a compression displacement $\Delta X$ and the elastic force Fs. The compression displacement $\Delta X$ is the compression amount of the miniature spring, Fp Fs. As described in the third embodiment and the fourth embodiment, the releasing action and releasing mechanism is that when the pressing force Fp generated by the pressure difference $\Delta P$ cannot resist the elastic force Fs of the miniature spring, Fp Fs, the floating ball is pushed away and moved to the inner chamber without covering the outer gas hole.

As described in the third embodiment and the fourth embodiment, the releasing mechanism is not restricted by the direction of the weight W of the floating ball and the direction of the pressing force Fp.

As described in the third embodiment and the fourth embodiment, the releasing mechanism is reliably completed due to the ratio of the outer diameter d1 of the floating ball to the inner diameter D2 of the inner chamber, d1/D2≤0.8.

As described in the third embodiment and the fourth embodiment, the outer diameter d1 of the floating ball is greater than the inner diameter d3 of the outer gas hole, the cone angle 2θ, 15°≤θ≤80°.

As described in the third embodiment and the fourth embodiment, the shielding time $\Delta t$ is adjusted by the weight W and the outer diameter d1 of the floating ball and the elastic force Fs of the miniature spring, and the adjustment of the elastic force Fs refers to adjusting the elastic coefficient of the miniature spring. As described in the third embodiment and the fourth embodiment, the adjusting mechanism includes the retaining nut set. The relative position of the ball seat of the adjusting shaft relative to an opening of the outer gas hole at the side of the inner chamber can be set to ensure that the floating ball can indeed complete the shielding action and the releasing action.

Fifth Embodiment

This embodiment is further described according to the summary of the invention. The buffer valve includes a miniature valve body, a breathing cover, and a floating ball. The floating ball has a cylindrical shape and includes a spherical curved surface at its front end and a cylinder at its rear end. The cylinder has a cylindrical blind hole. A magnetic ring is installed inside the floating ball. The magnetic ring is a long ring located near the spherical curved surface. The center of the magnetic ring and is concentric with the blind hole. The miniature valve body has a cylindrical shape and includes the inner chamber, an outer chamber, a partition portion, the outer gas hole, and a magnetic member. The outer chamber is configured to mount the gas connector. The partition portion is located in the middle of the miniature valve body to separate the inner chamber and the outer chamber at two ends. The inner chamber and the outer chamber are in communication with each other through the outer gas hole. The outer gas hole is located at the center of the partition portion. The magnetic member is annular and is mounted on one side of the partition portion close to the inner chamber and is concentric with the outer gas hole. The breathing cover is configured to connect the breathing hole and includes an inner accommodating chamber, the inner micro gas hole, an external thread, and a central post. The external thread of the breathing cover is coupled and sealed with the breathing hole. The inner micro gas hole is located on the breathing cover and deviated from the axis of the inner accommodating chamber and is close to the inner annular surface to communicate with the breathing hole. The central post of the breathing cover is mounted at a central position of a bottom of the inner accommodating chamber and extends into the inner chamber and is fitted in the blind hole of the floating ball. An outer ring surface of the miniature valve body is coupled and sealed with the inner accommodating chamber of the breathing cover. The floating ball is disposed in the inner flow channel and can move back and forth on the central post.

A mutually repulsive magnetic force Fm is generated between the magnetic ring of the floating ball and the magnetic member of the miniature valve body. The shielding action is that when the magnetic force Fm mutually repelling the magnetic ring of the floating ball and the magnetic member of the miniature valve body cannot resist the pressing force Fp generated by the pressure difference $\Delta P$, Fm<Fp, the floating ball is secured to the outer gas hole. The releasing mechanism is that when the pressing force Fp generated by the pressure difference $\Delta P$ cannot resist the magnetic force Fm mutually repelling the magnetic ring and the magnetic member, Fm>Fp, the floating ball is displaced backward to the inner chamber and no longer covers the outer gas hole. As described in the fifth embodiment, the releasing mechanism is not restricted by the direction of the weight W of the floating ball and the direction of the pressing force Fp.

As described in the fifth embodiment, the releasing action is reliably completed due to the ratio of the outer diameter d1 of the floating ball to the inner diameter D2 of the inner chamber, d1/D2≤0.8. As described in the fifth embodiment, when the outer diameter d1 of the floating ball is greater than the inner diameter d3 of the outer gas hole, the cone angle 2θ, 15°≤θ≤80°.

As described in the fifth embodiment, in the adjusting mechanism, the shielding time Δt is adjusted by the weight W and the outer diameter d1 of the floating ball and the magnetic force Fm. The adjusting mechanism of the magnetic force Fm refers to adjusting a mutual repulsive force between the magnetic ring and the magnetic member of the miniature valve.

The summary of the invention and the embodiments of the invention can solve the first, second, third, fourth and fifth problems, and fully meet the first, second, third and fourth requirements, thereby meeting the unique needs of clean fluid and particle suspension fluid transportation. The invention will be further described below with several embodiments.

BRIEF DESCRIPTION OF THE DRAWINGS

FIG. 3B' is a partial enlarged view of FIG. 3B;

FIG. 6B' is a partial enlarged view of FIG. 6B;

FIG. 6C' is a partial enlarged view of FIG. 6C;

FIG. 7B' is a partial enlarged view of FIG. 7B;

FIG. 7C' is a partial enlarged view of FIG. 7C;

FIG. 8C' is a partial enlarged view of FIG. 8C;

FIG. 8D' is a partial enlarged view of FIG. 8C.

DETAILED DESCRIPTION OF THE PREFERRED EMBODIMENTS

Embodiments of the present invention will now be described, by way of example only, with reference to the accompanying drawings.

Figure 4:
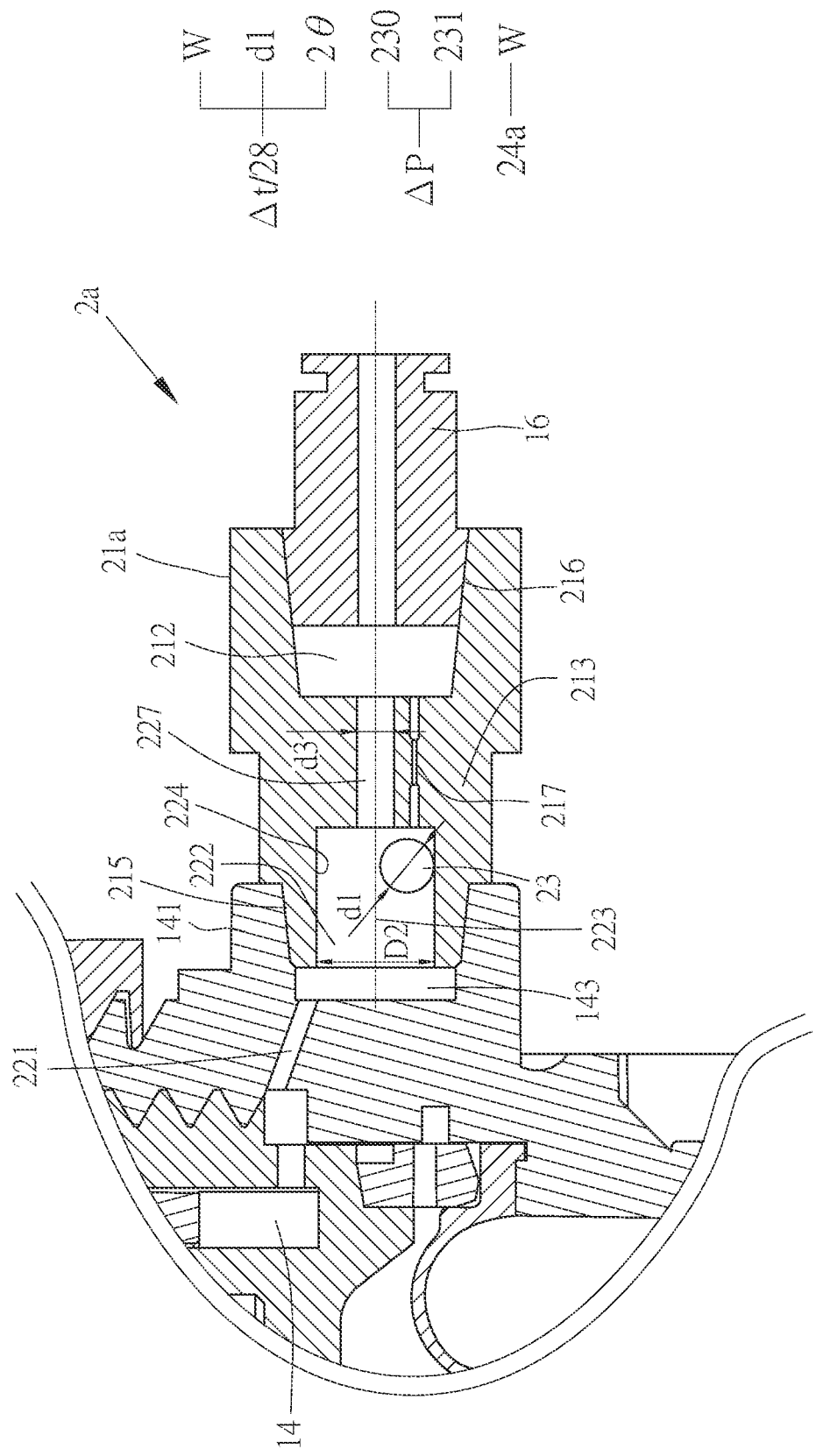
FIG. 4 is a cross-sectional view of the buffer valve 2a of the first embodiment.
Figure 5:
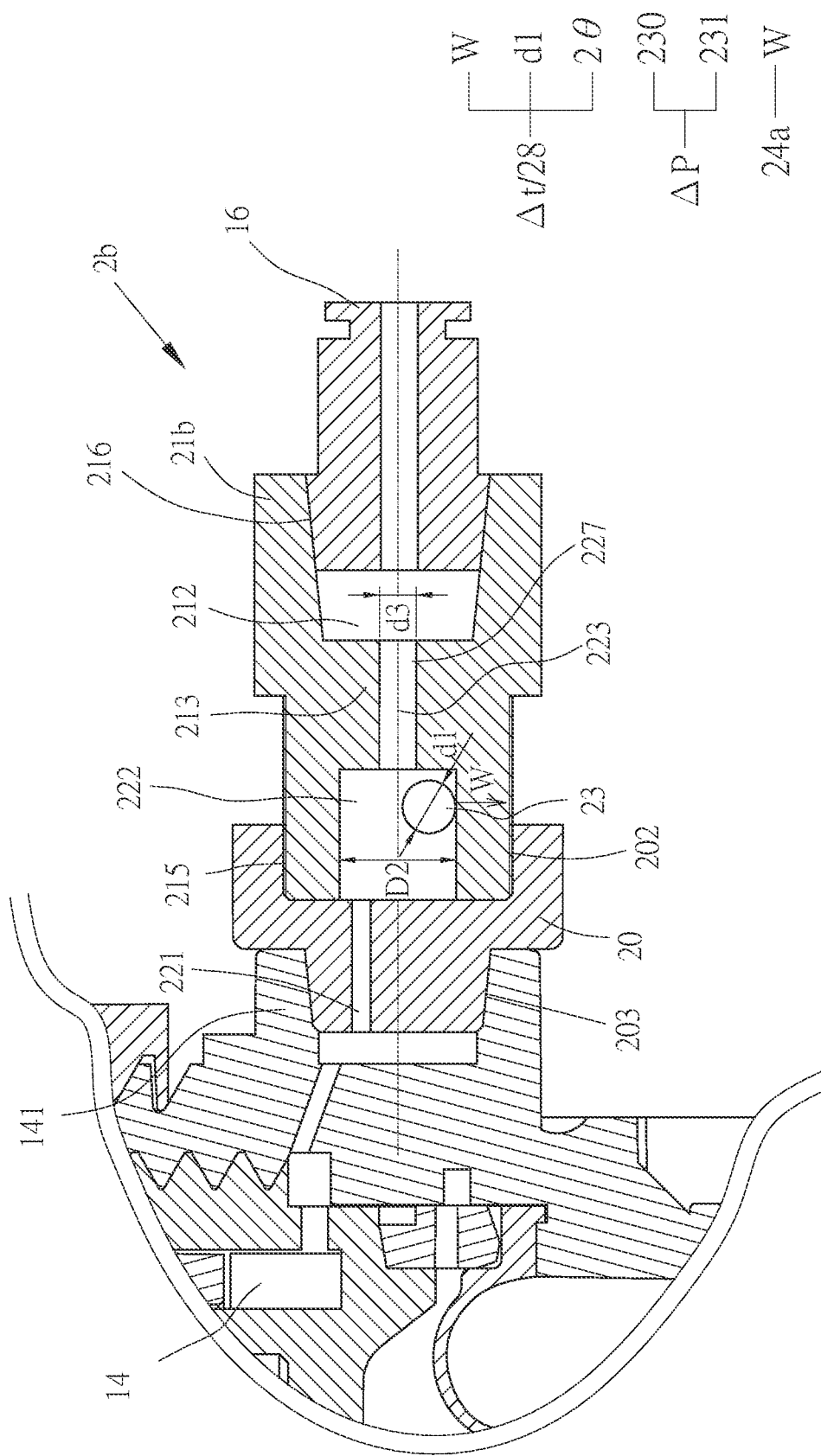
FIG. 5 is a cross-sectional view of the buffer valve 2b of the second embodiment.
Figure 6A:
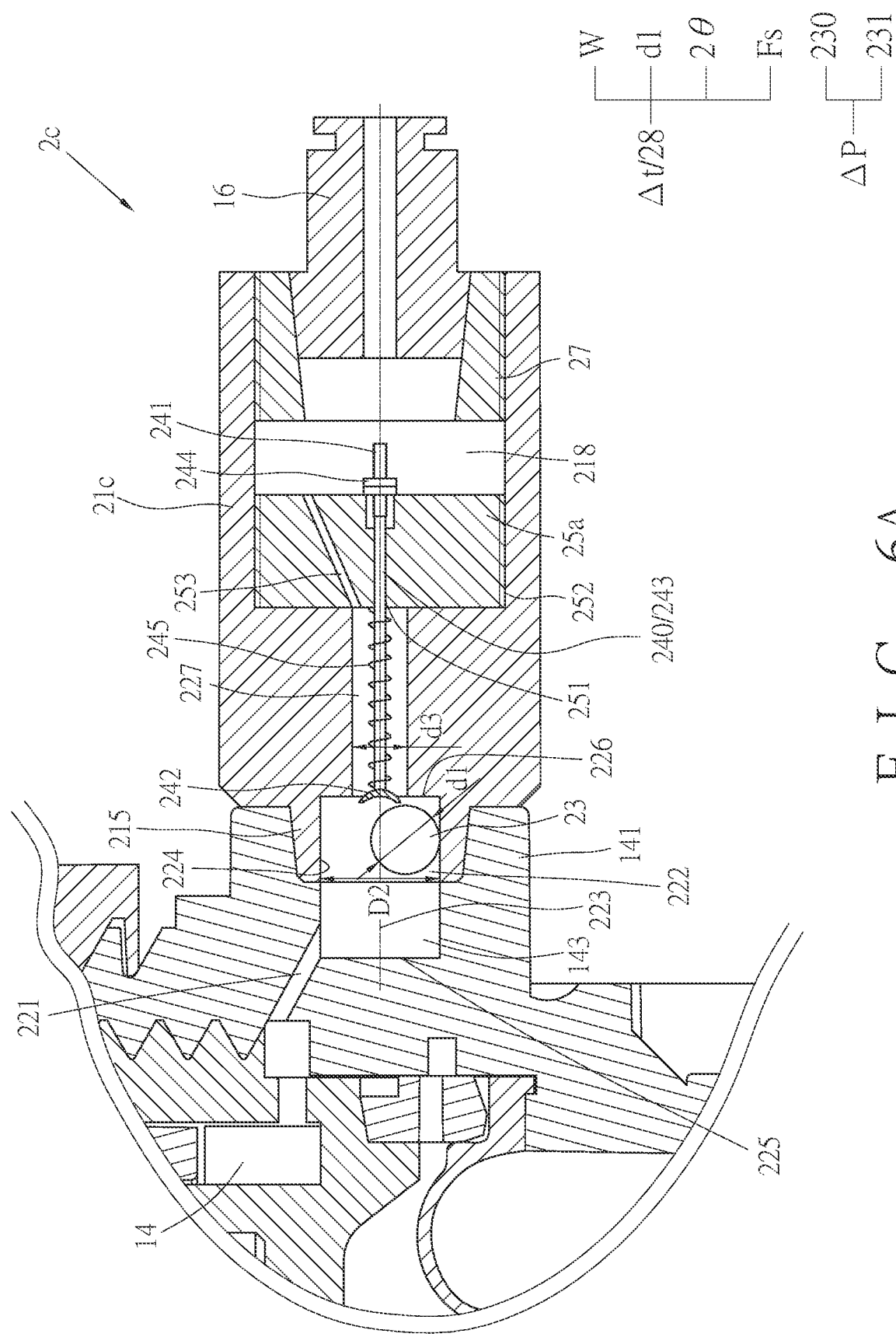
FIG. 6A is a cross-sectional view of the buffer valve 2c of the third embodiment, particularly to the miniature valve body 21c.
Figure 6B:
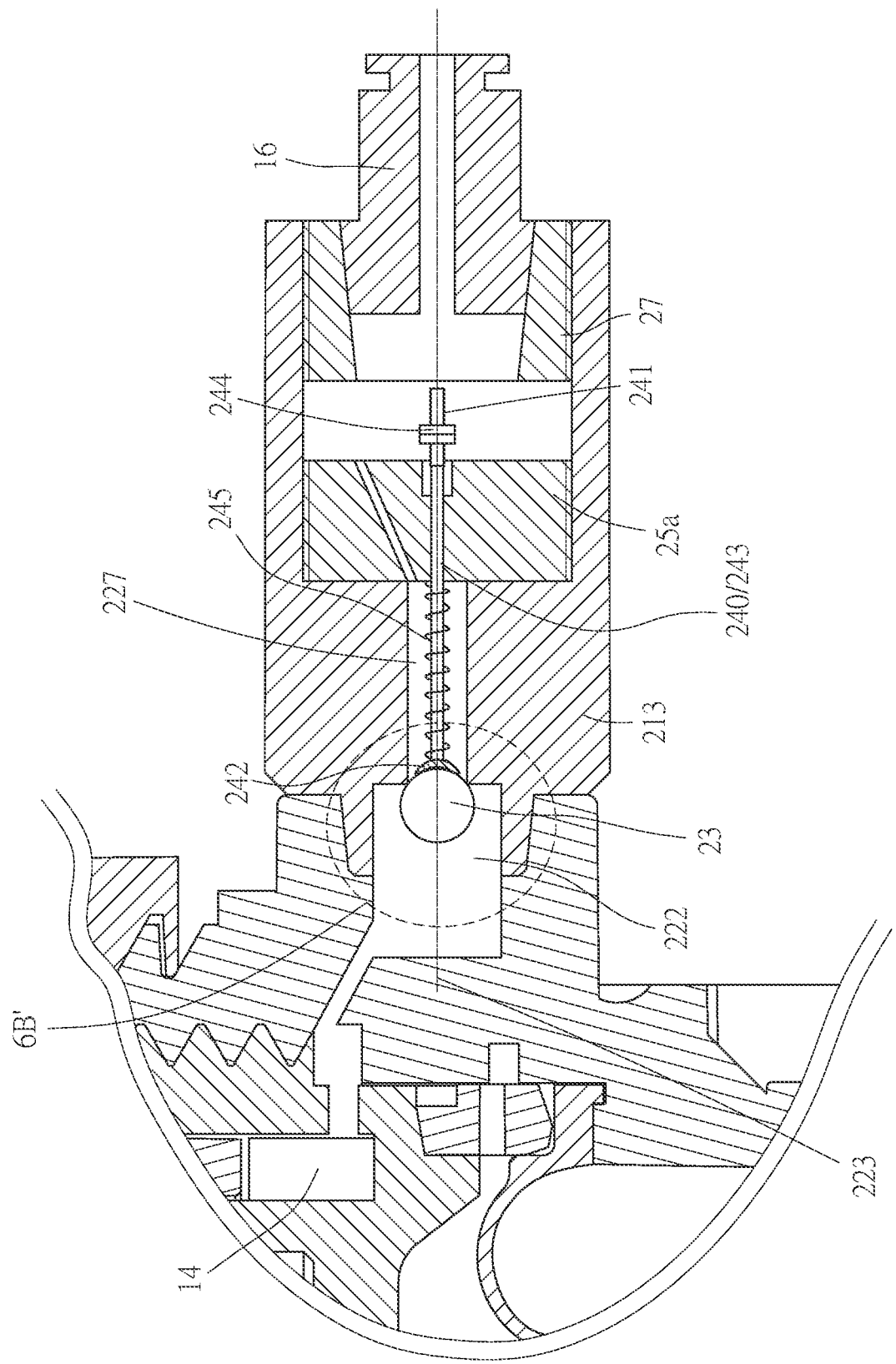
FIG. 6B is a schematic view illustrating the floating ball, the outer gas hole and the cone angle 2θ in the beginning of releasing the high-pressure gas of the buffer valve 2e in the third embodiment.
Figure 6B:
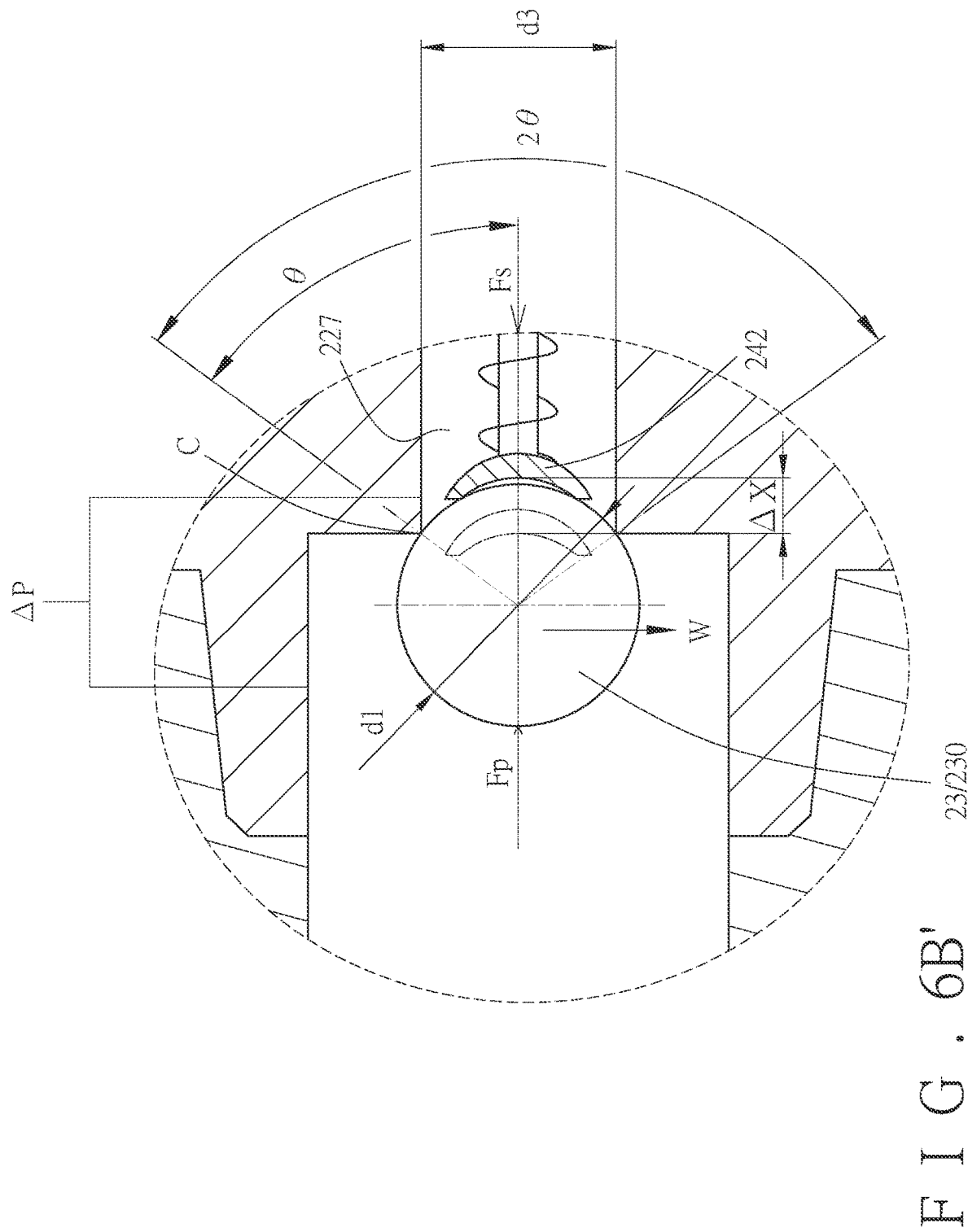
Figure 6C:
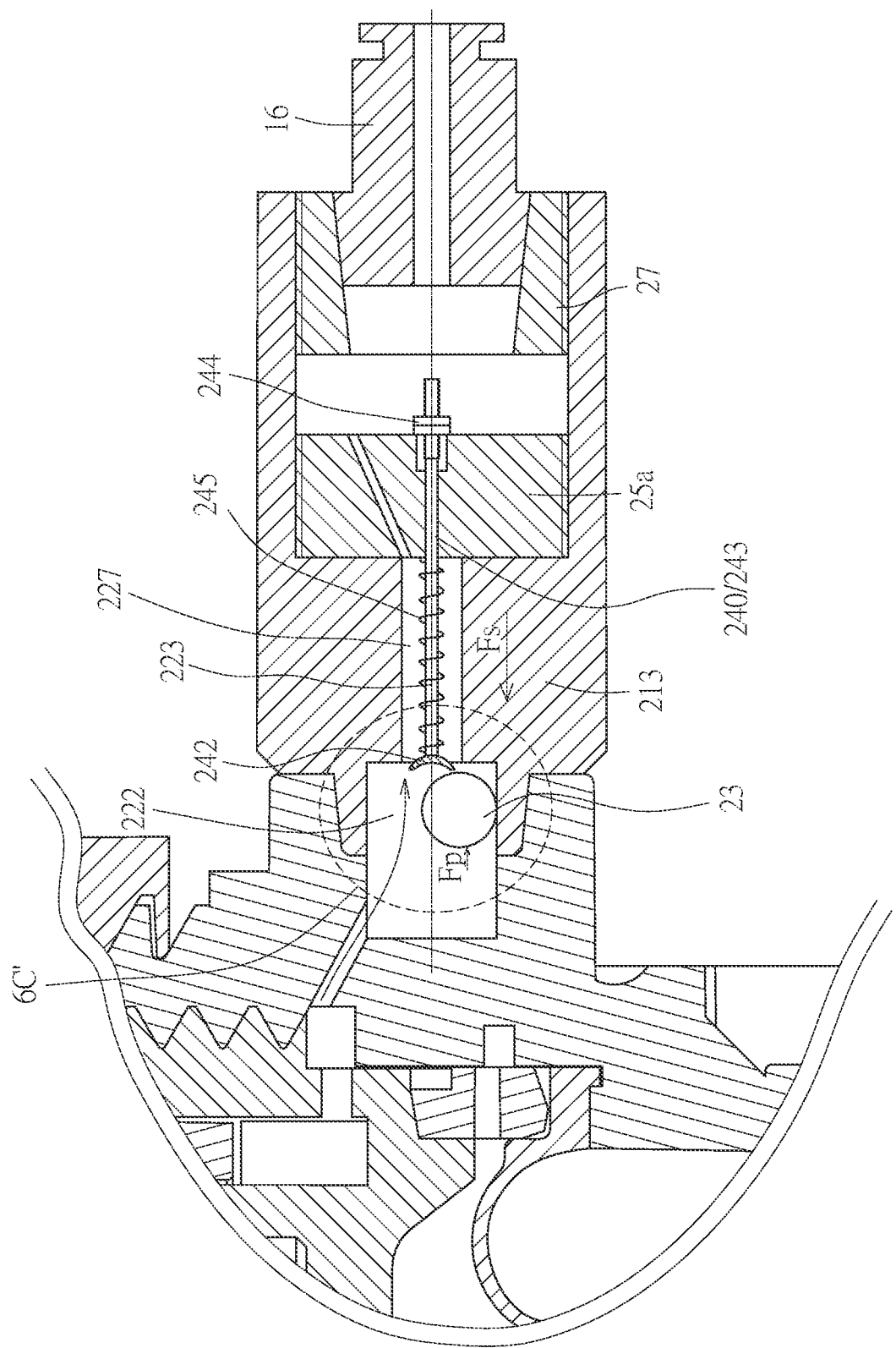
FIG. 6C is a schematic view illustrating the positions of the floating ball and the inner chamber at the end of releasing the high-pressure gas of the buffer valve 2e in the third embodiment.
Figure 6C:
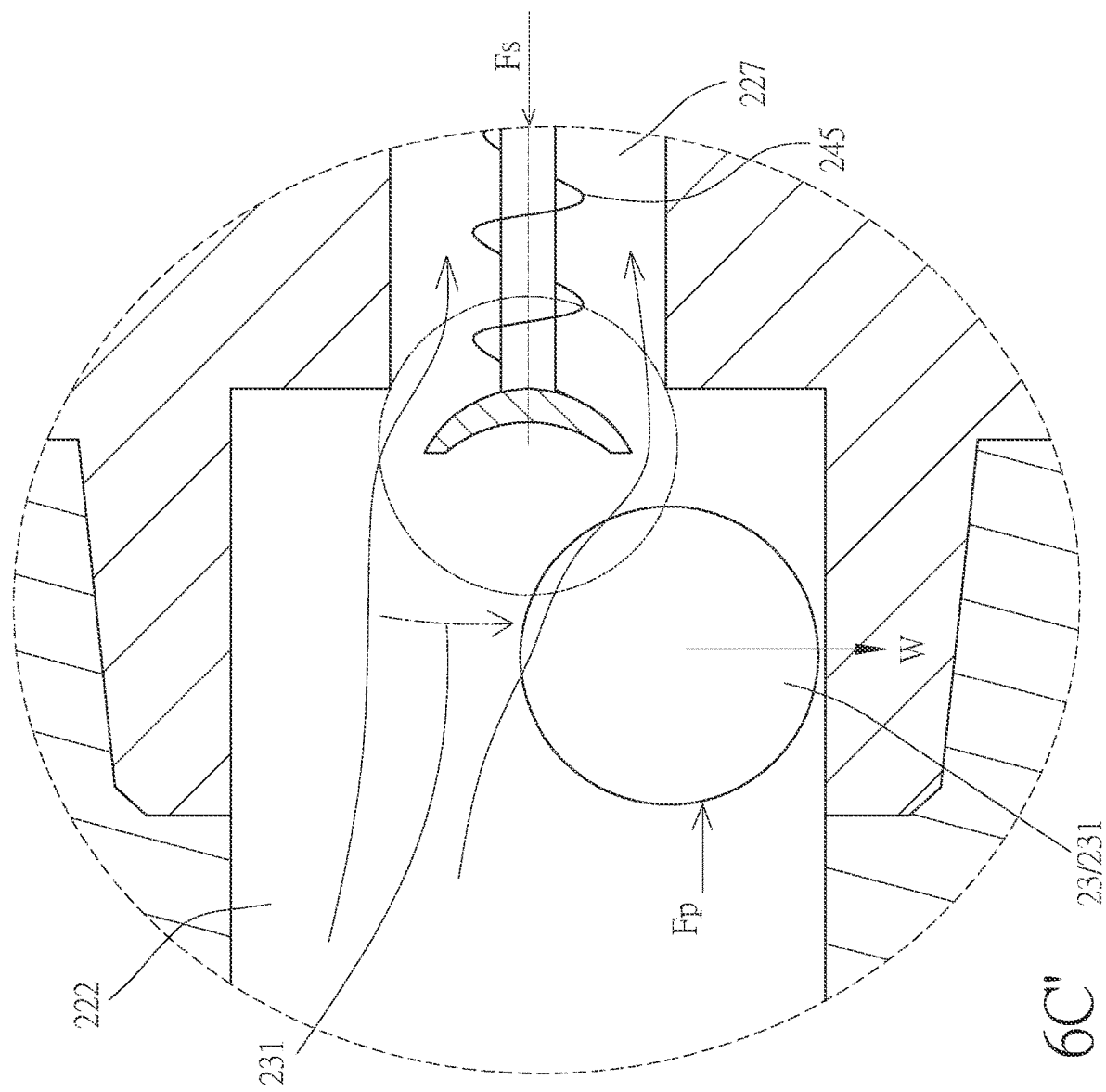
Figure 7A:
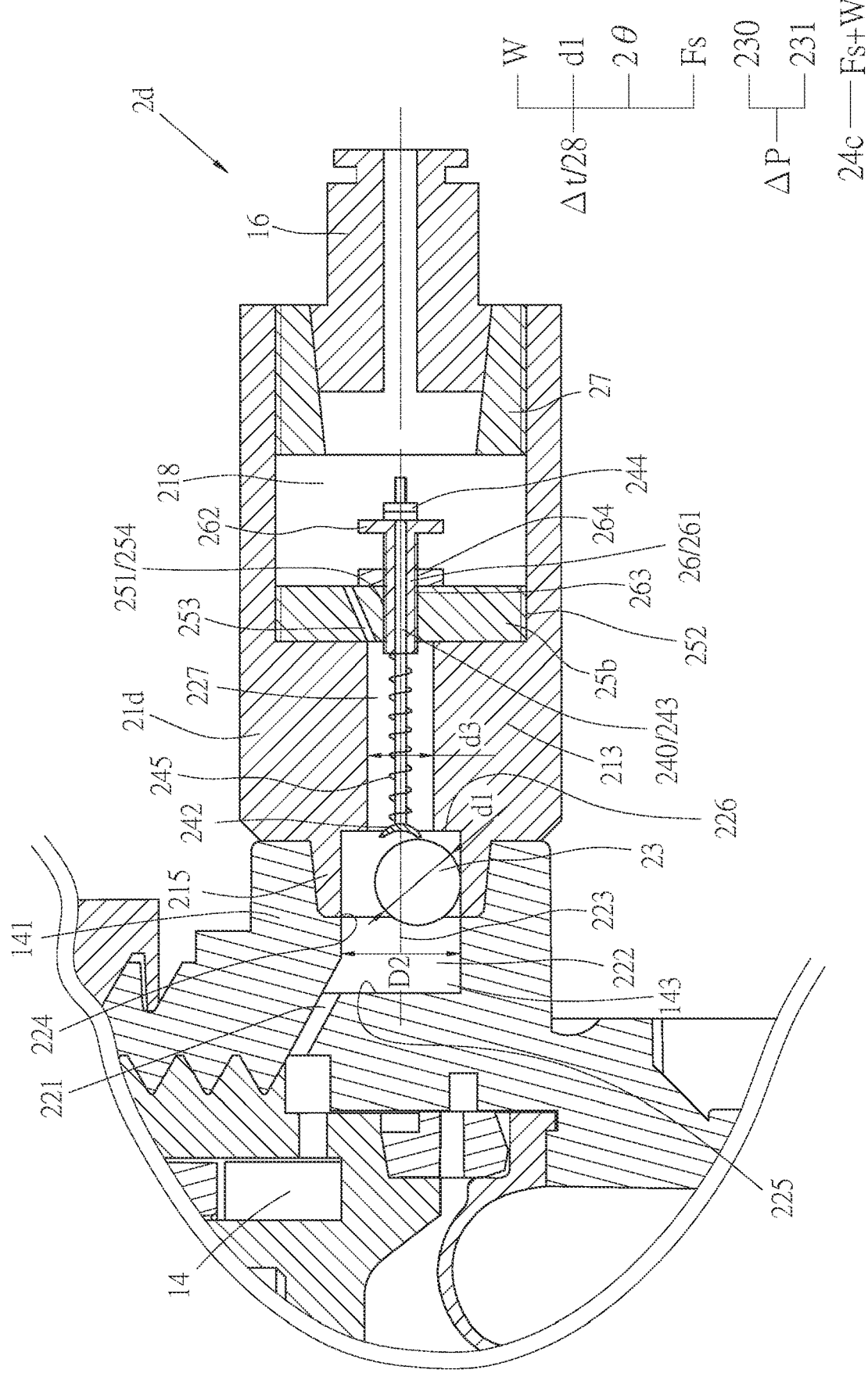
FIG. 7A is a cross-sectional view of the buffer valve 2d of the fourth embodiment, particularly to the miniature valve body 21d.
Figure 7B:
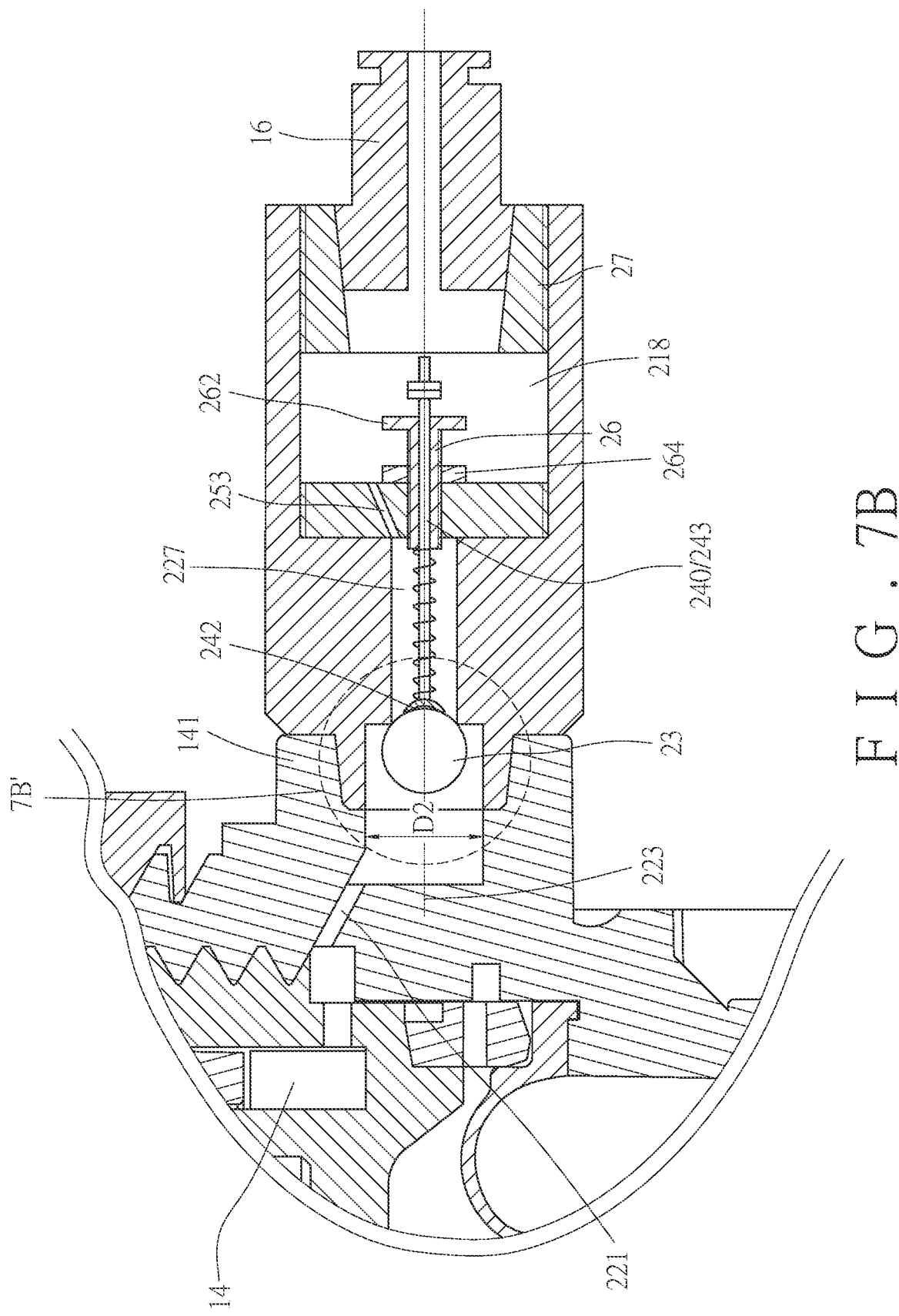
FIG. 7B is a schematic view illustrating the floating ball, the outer gas hole and the cone angle 2θ in the beginning of releasing the high-pressure gas of the buffer valve 2d in the fourth embodiment.
Figure 7B:
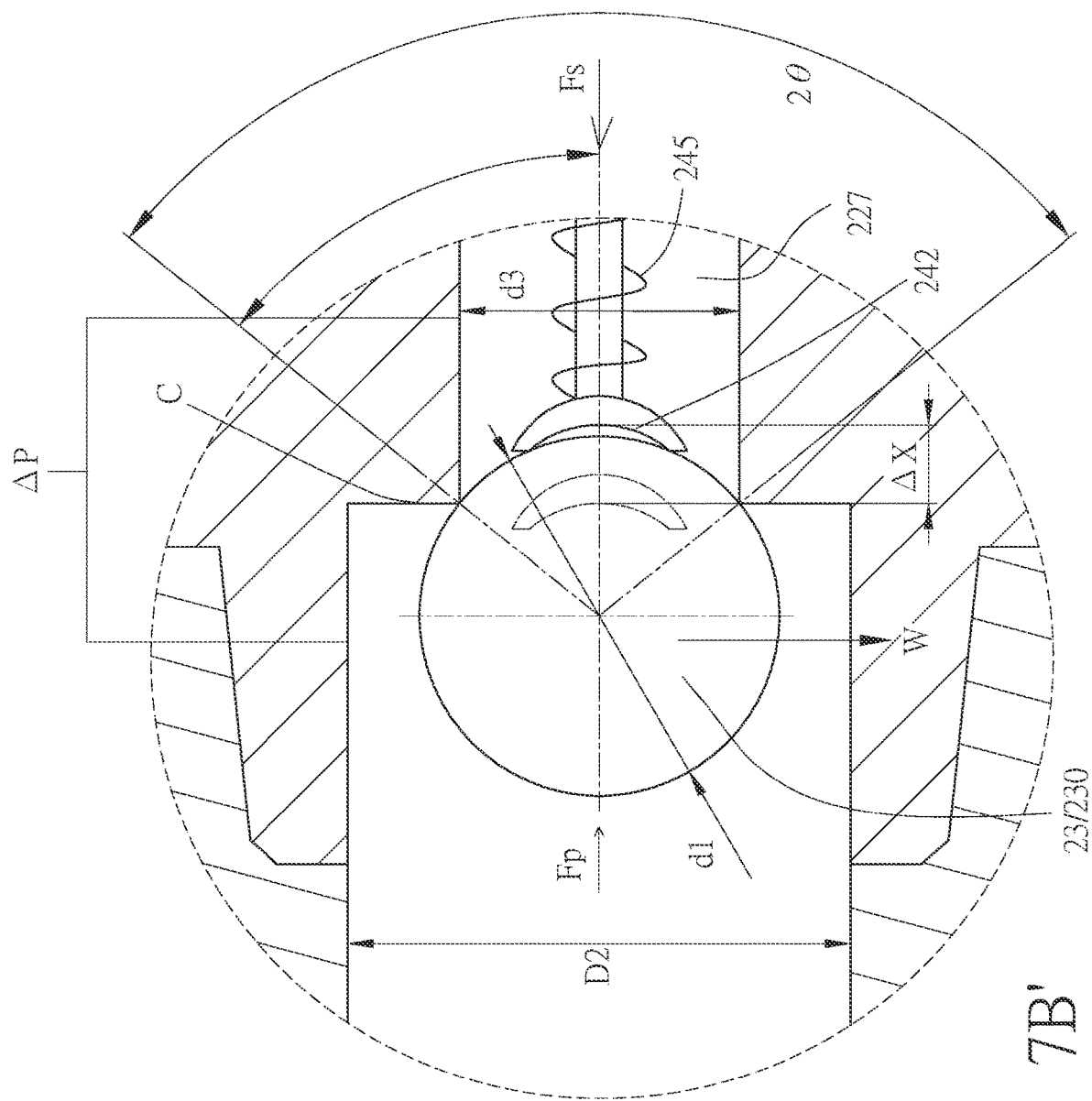
Figure 7C:
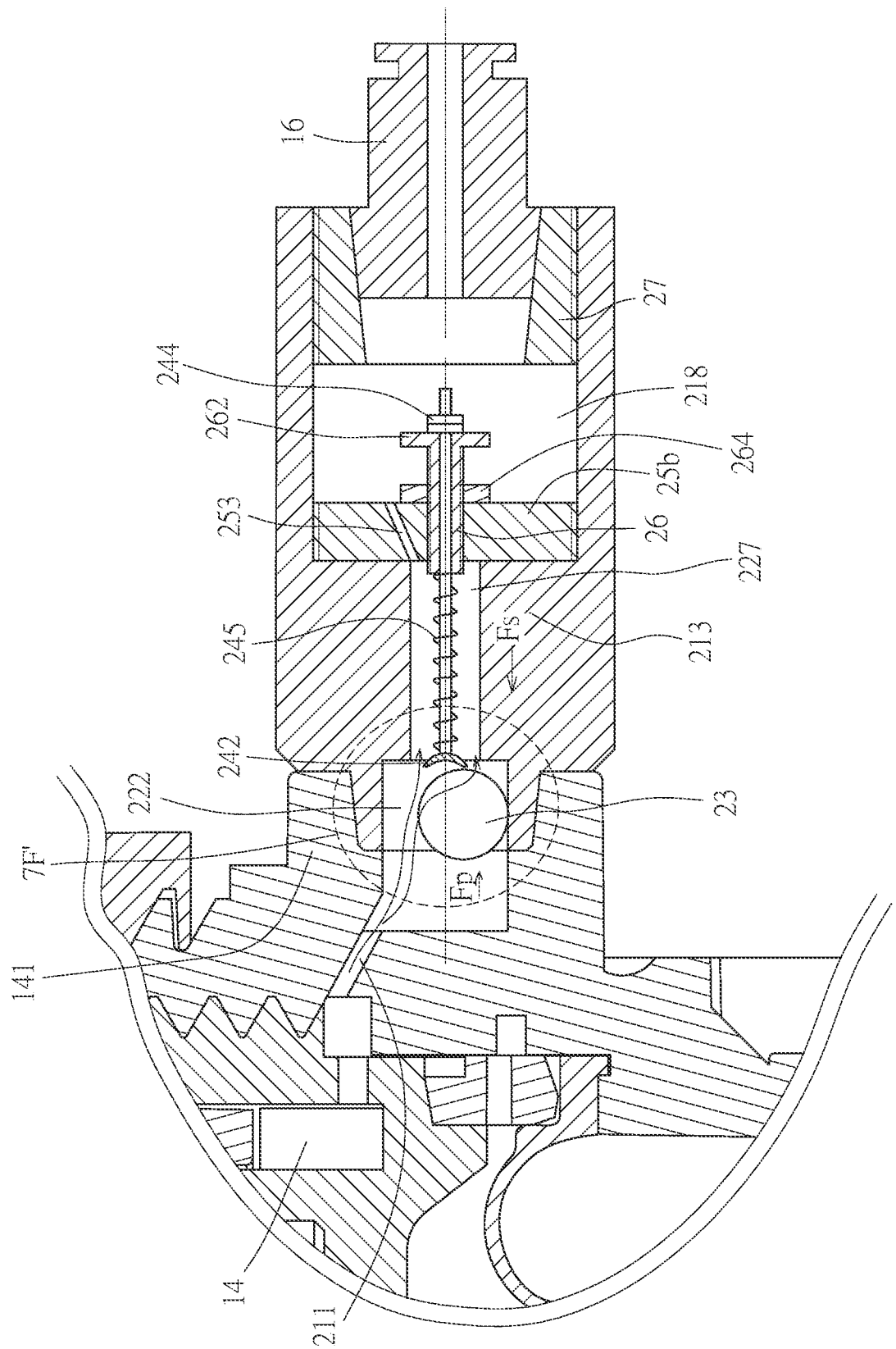
FIG. 7C is a schematic view illustrating the positions of the floating ball and the inner chamber at the end of releasing the high-pressure gas of the buffer valve 2e in the fourth embodiment.
Figure 7C:
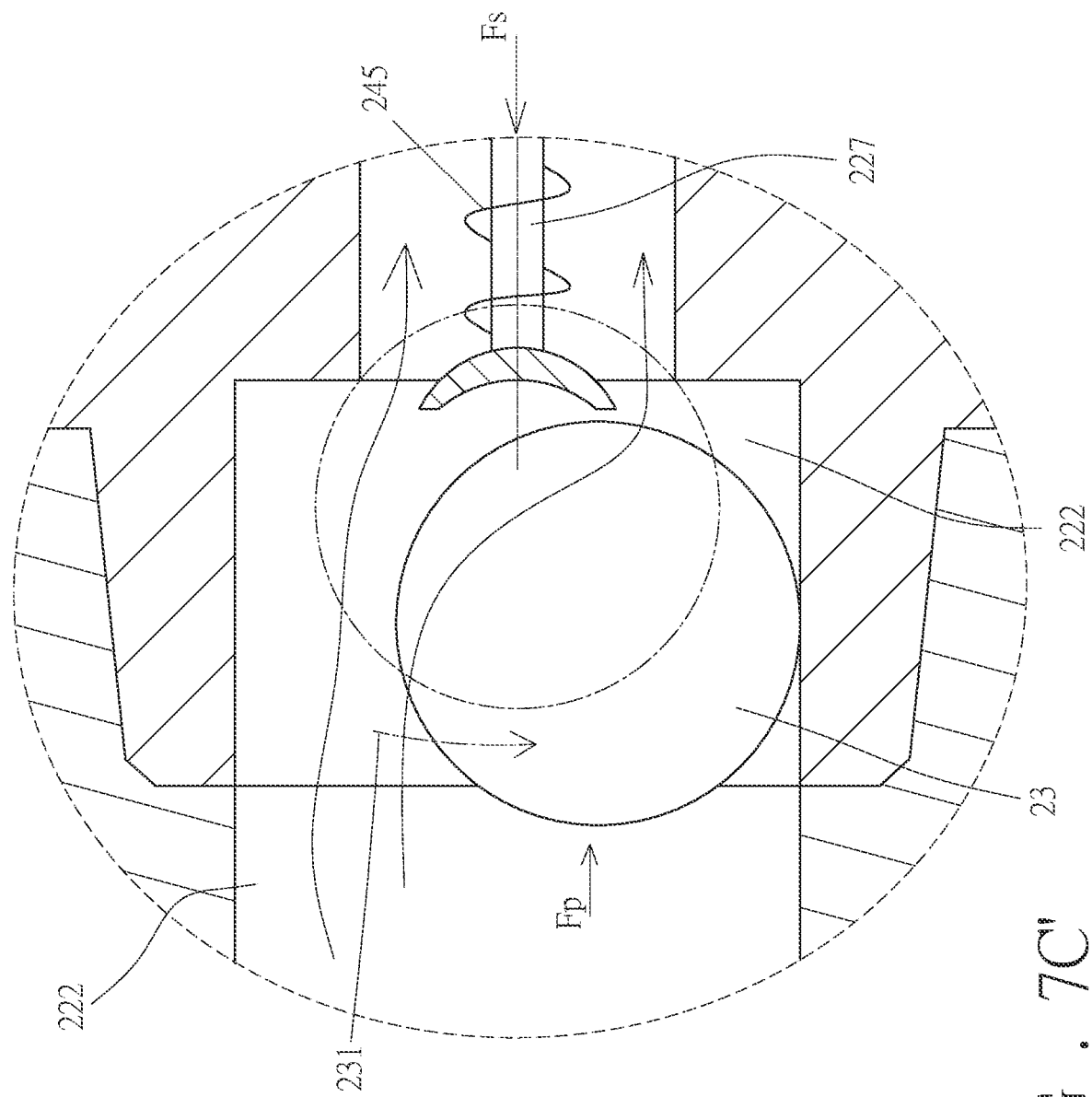
Figure 8A:
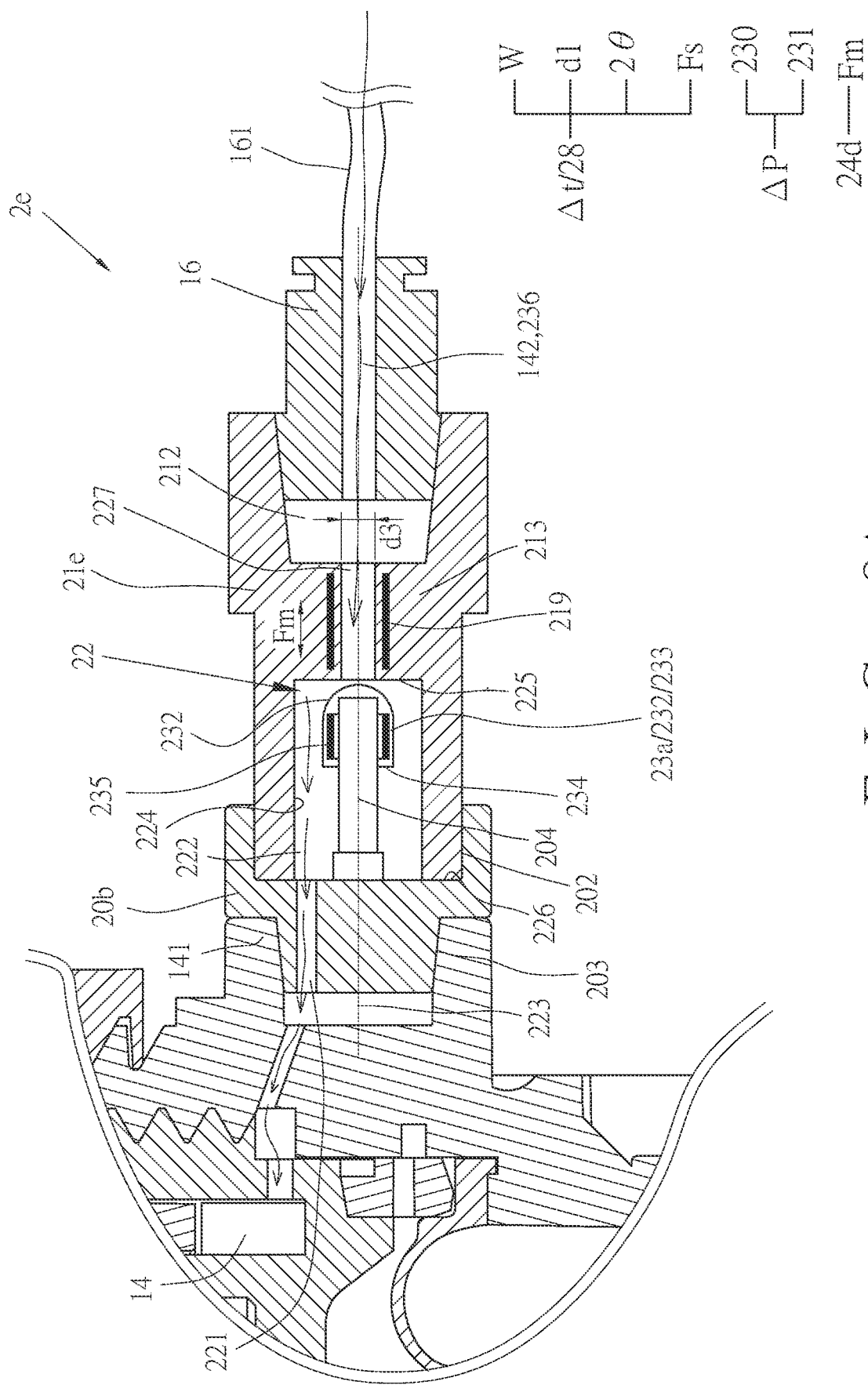
FIG. 8A is a cross-sectional view of the buffer valve 2e of the fifth embodiment.
Figure 8B:
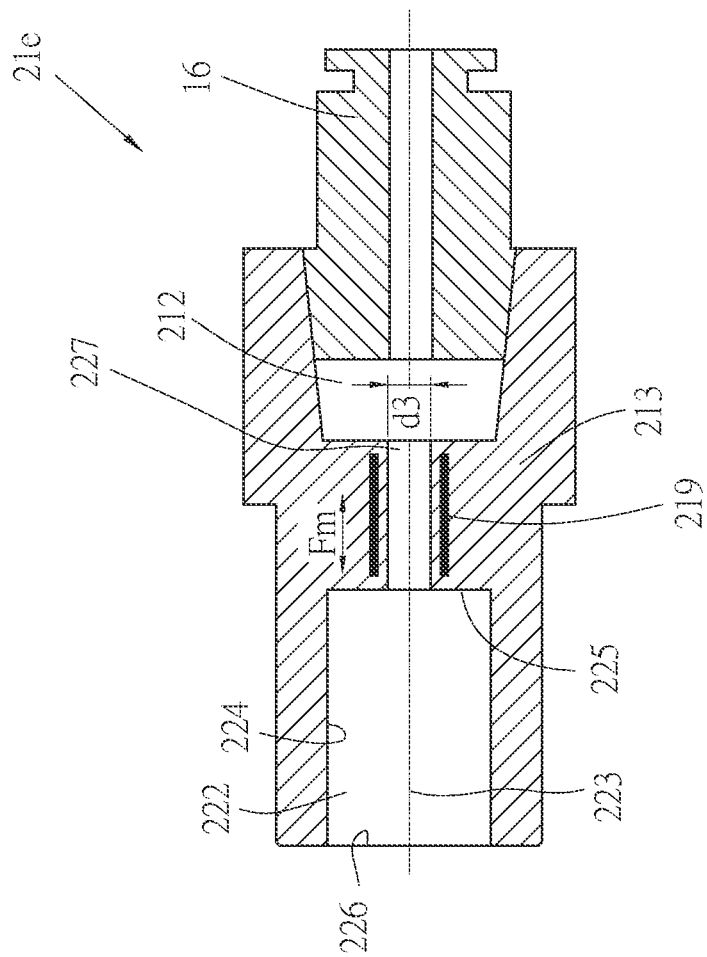
FIG. 8B is a cross-sectional view of the miniature valve body 21e of the fifth embodiment.
Figure 8C:
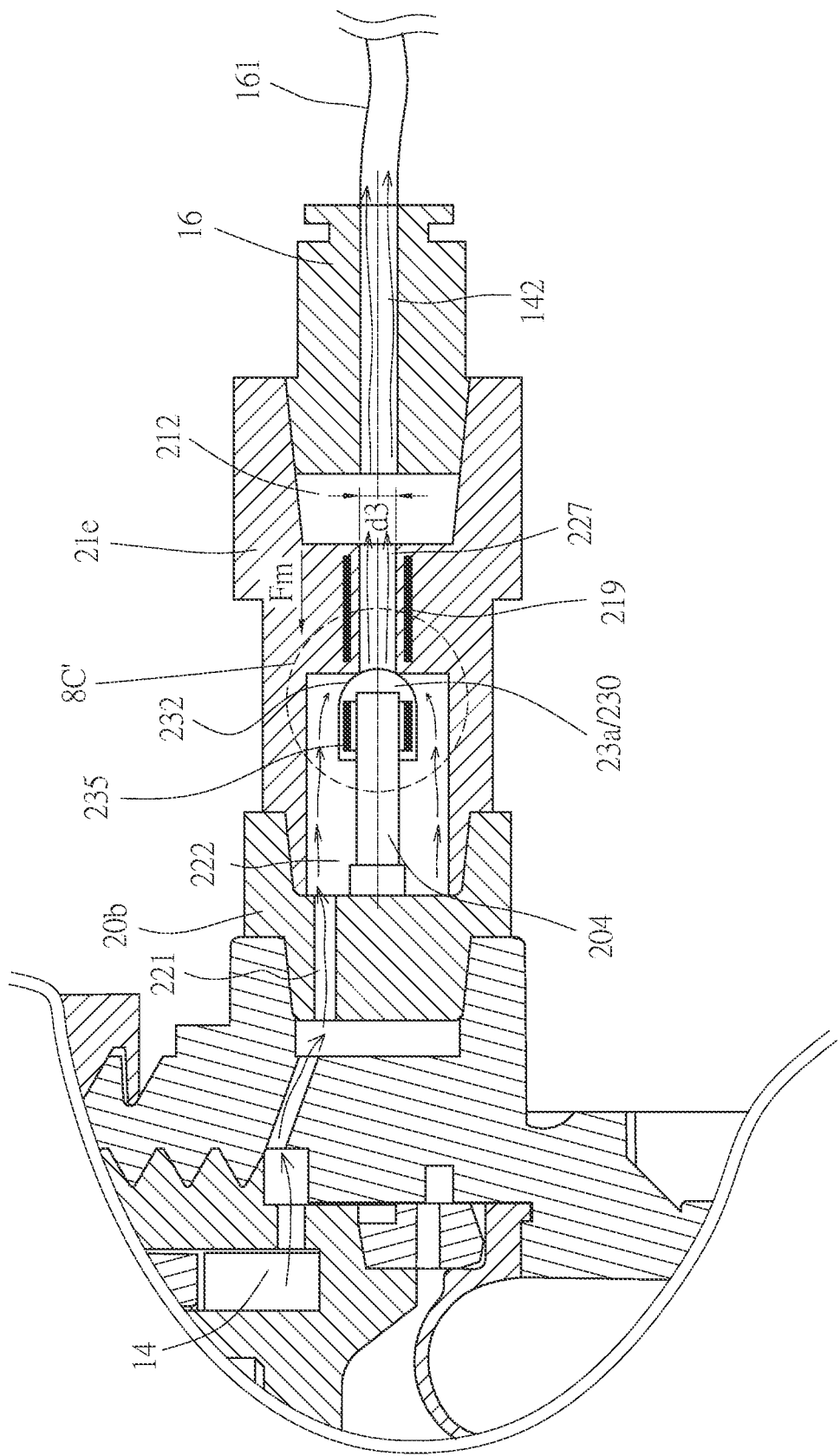
FIG. 8C is a schematic view illustrating the floating ball, the outer gas hole and the cone angle 2θ in the beginning of releasing the high-pressure gas of the buffer valve 2e in the fifth embodiment.
Figure 8C:
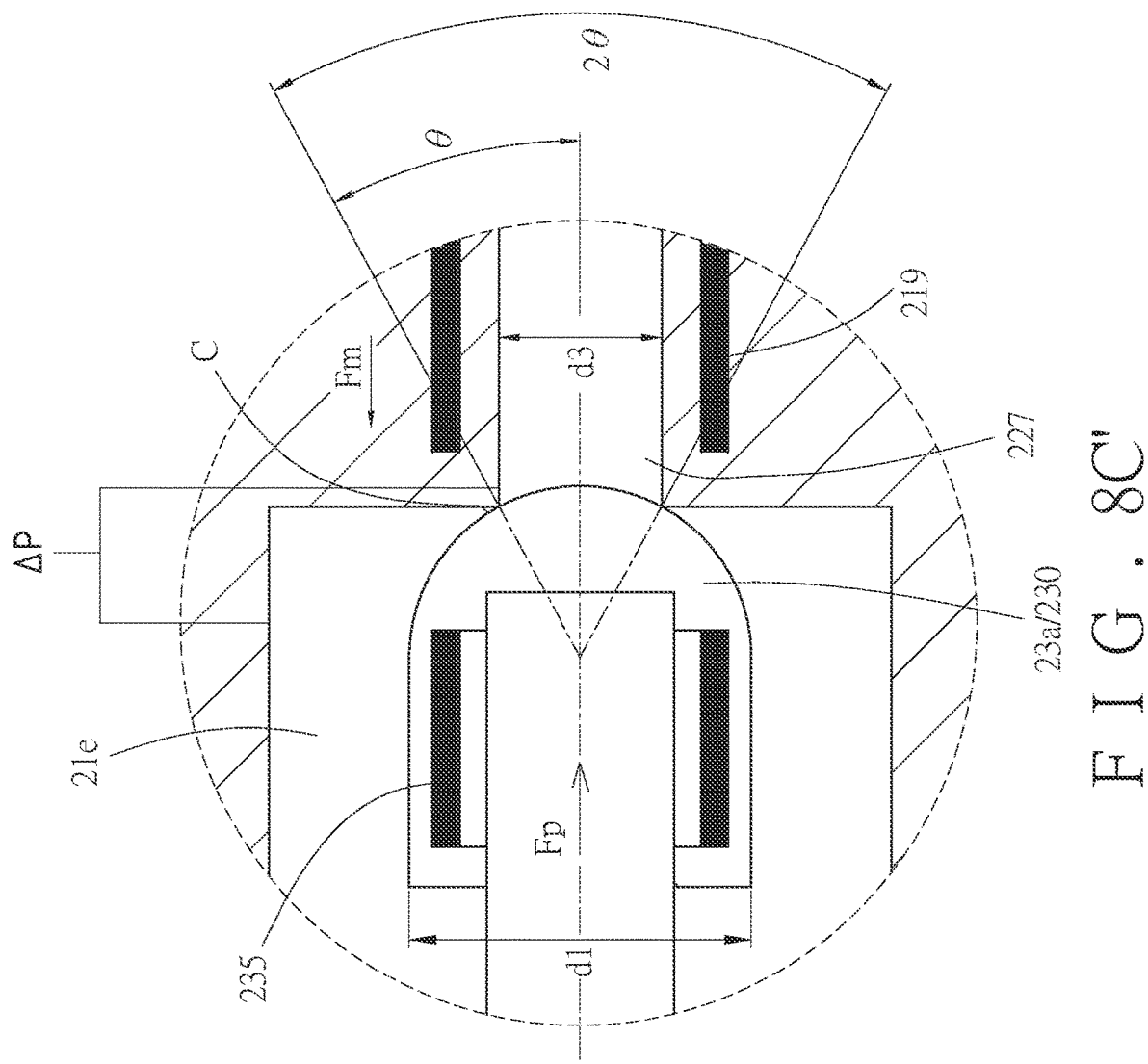
Figure 8D:
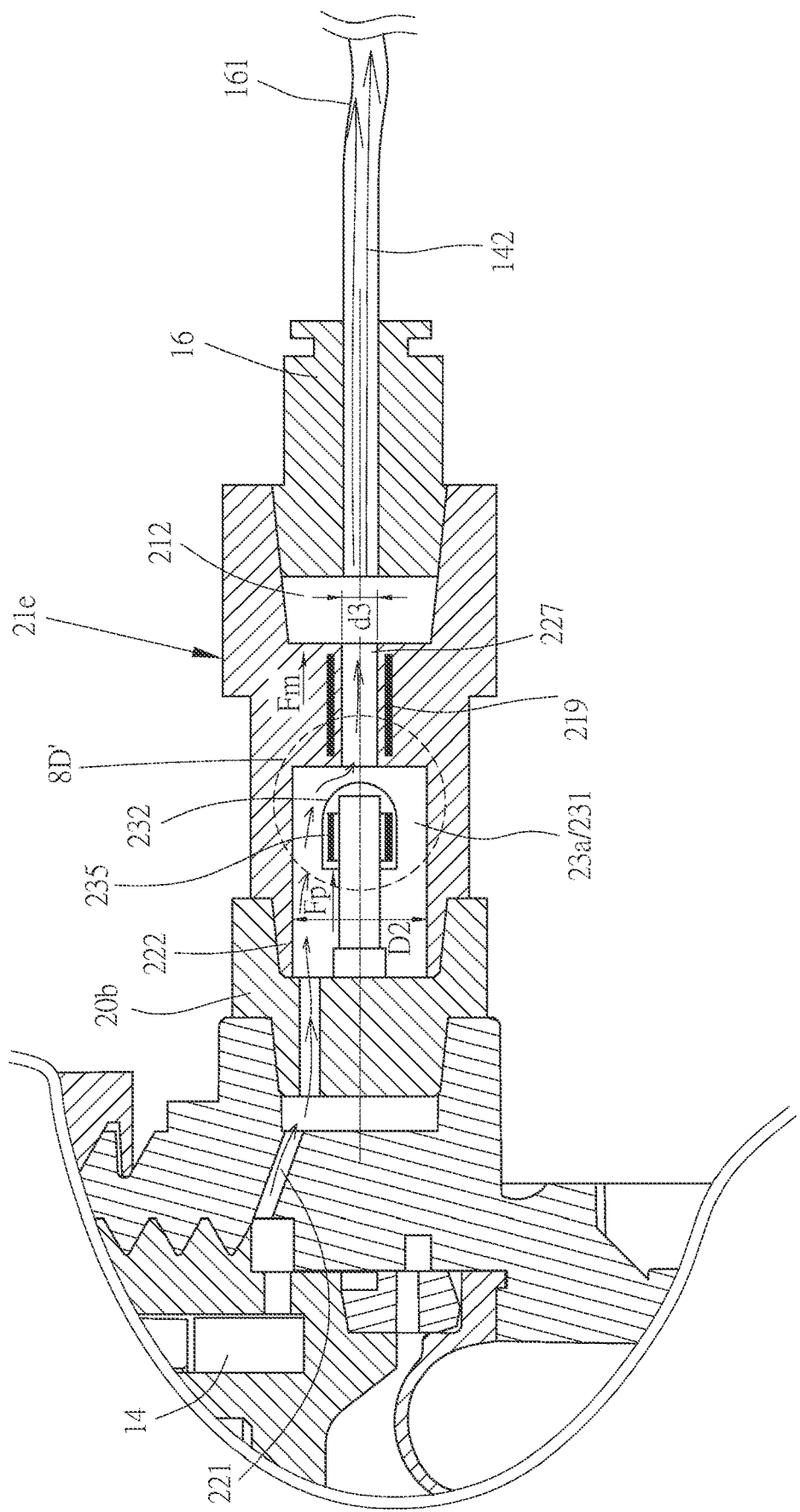
FIG. 8D is a schematic view illustrating the positions of the floating ball and the inner chamber at the end of releasing the high-pressure gas of the buffer valve 2e in the fifth embodiment.
Figure 8D:
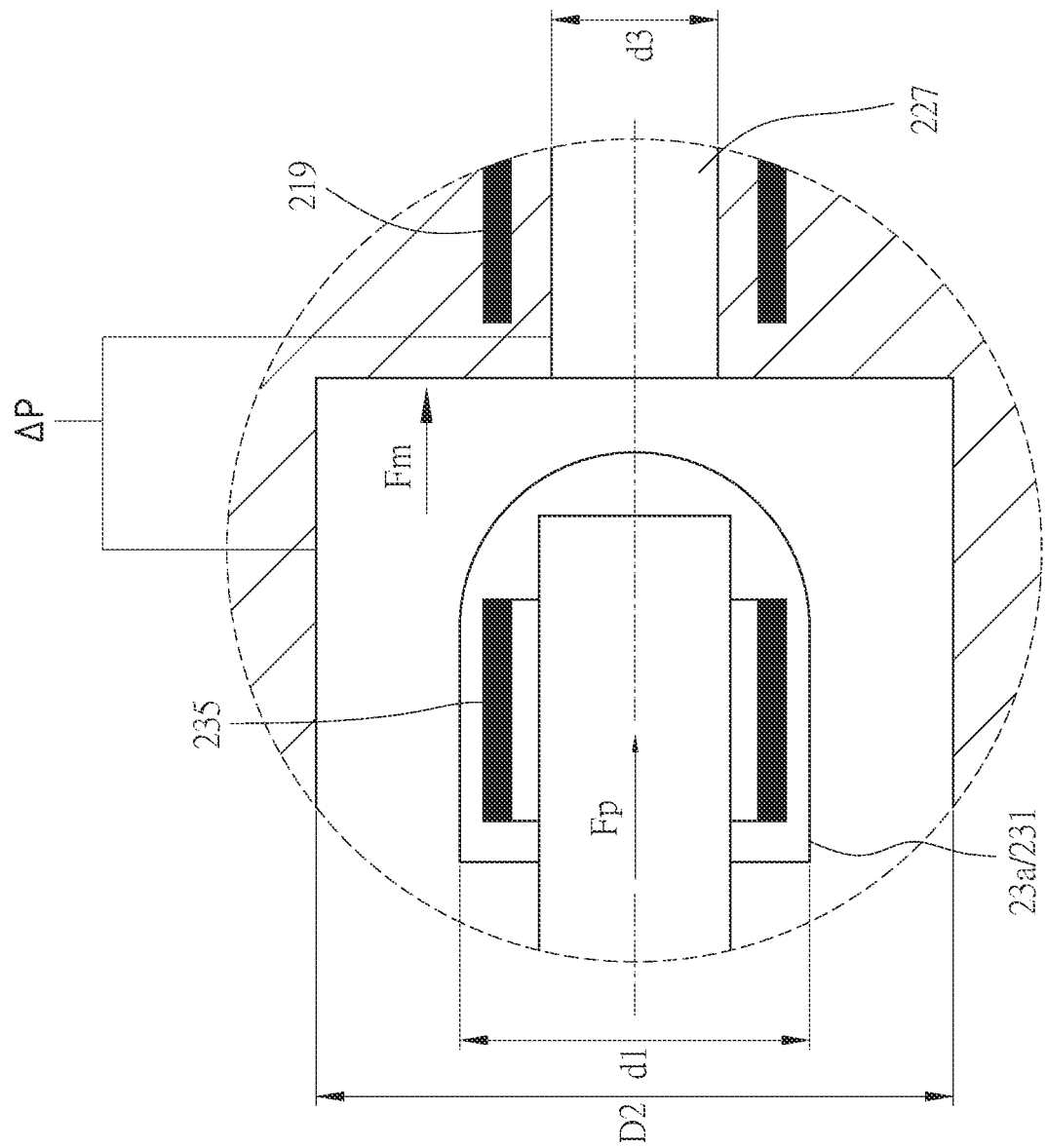

For all the descriptions, please refer to FIG. 1, FIG. 2, FIG. 3A, FIG. 3B, FIG. 3B', FIG. 3C, FIG. 4, FIG. 5, FIG. 6A, FIG. 6B, FIG. 6B', FIG. 6C, FIG. 6C', FIG. 7A, FIG. 7B, FIG. 7B', FIG. 7C, FIG. 7C', FIG. 8A, FIG. 8B, FIG. 8C, FIG. 8C', FIG. 8D, and FIG. 8D'.

Figure 1:
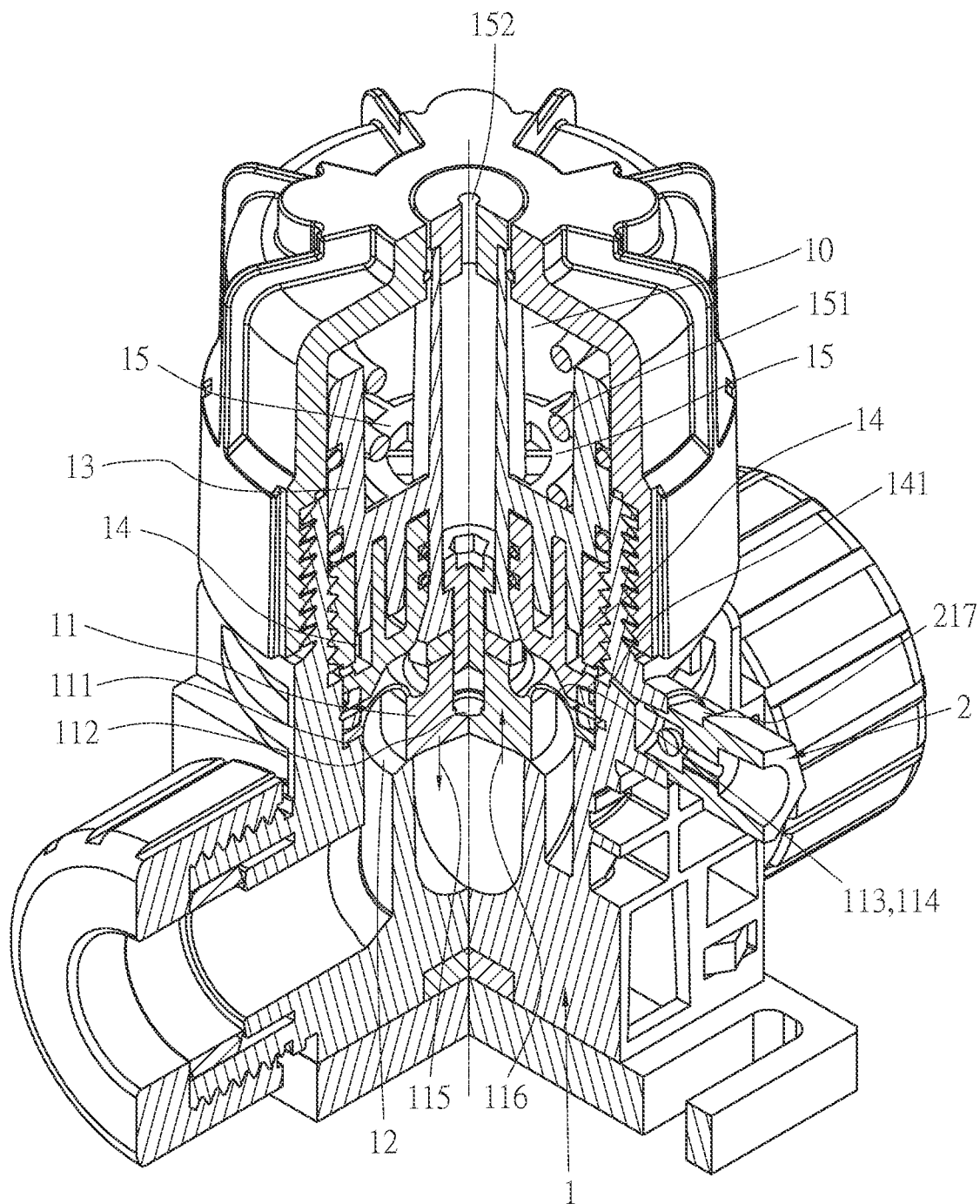
FIG. 1 is a sectional view of the pneumatic diaphragm valve.
Figure 2:
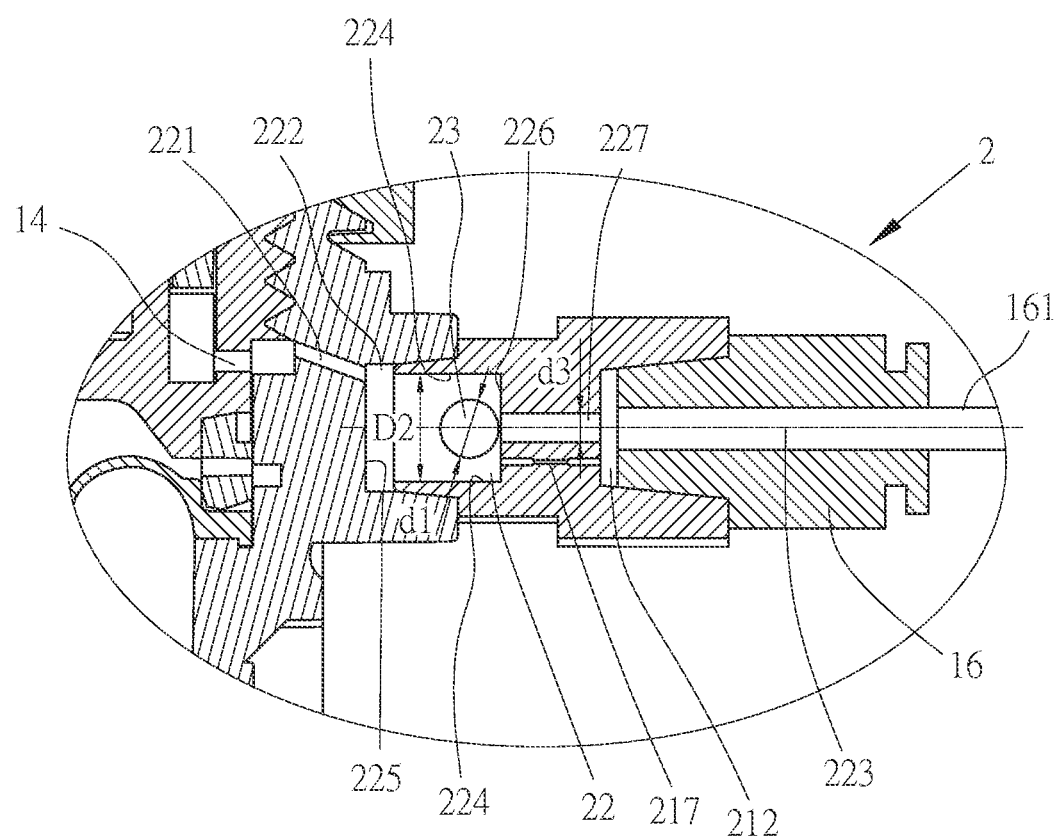
FIG. 2 is a sectional view of the breathing hole.
Figure 3A:
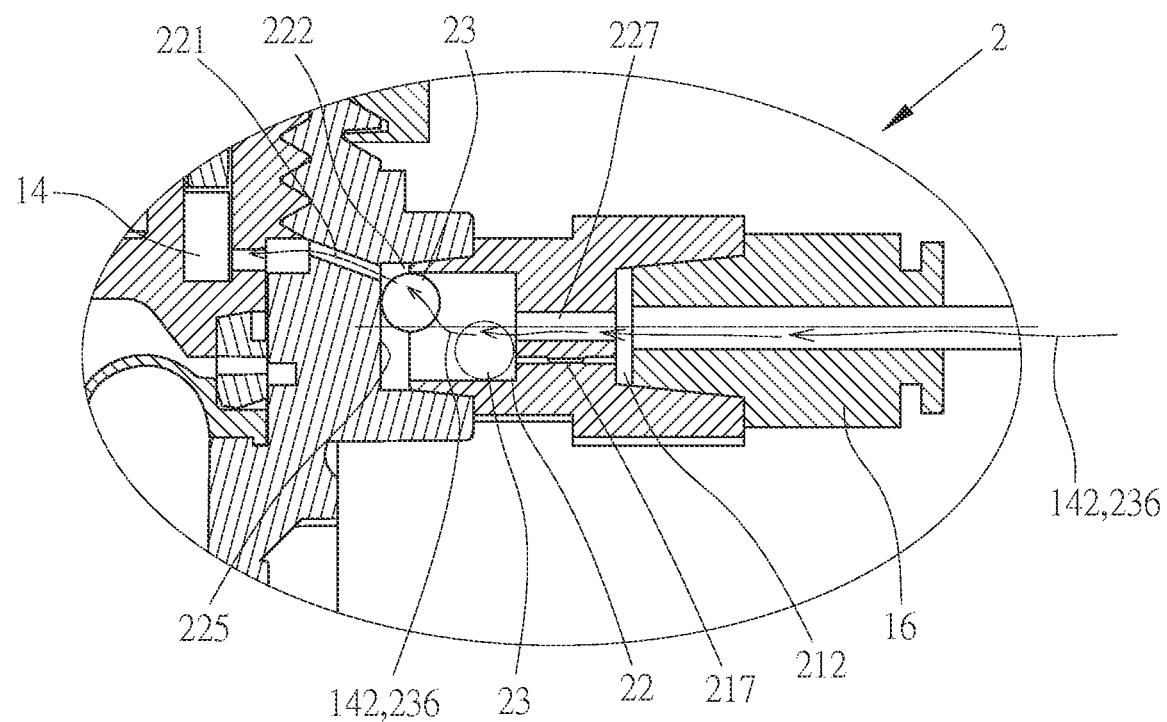
FIG. 3A is a schematic view illustrating the positions of the floating ball and the inner micro gas hole when the pneumatic chamber is filled with the gas.

Please refer to FIG. 1 and FIG. 2. The schematic views of the following embodiments all take the normally closed valve as an example. The relevant application of the normally open valve is supplemented by the literal description. The present invention is a buffer valve 2, which is a two-way valve. The buffer valve 2 is installed on a pneumatic diaphragm valve 1 for adjusting the release of the high-pressure gas without affecting a high-filling action 236 of the high-pressure gas. (The high-filling action 236 is shown in FIG. 3A.) The pneumatic diaphragm valve 1 includes a pneumatic cylinder 10, a diaphragm 11, and a valve seat 12. The pneumatic cylinder 10 is divided into a pneumatic chamber 14 and a spring chamber 15 by a piston 13. A spring 151 is disposed in the spring chamber 15. The spring chamber 15 has a breathing hole 152. The pneumatic chamber 14 has a breathing hole 141. The diaphragm 11 is an integral structure, having a circumferential portion 111, a central portion 112 and an elastic portion 113. The elastic portion 113 has a Ω-shaped cross section with an arc-shaped curve 114. The buffer valve 2 is installed in the breathing hole 141 of the pneumatic chamber 14 to adjust the flow rate of the breathing hole 141.

When the high-pressure gas is released in the pneumatic diaphragm valve 1 of the normally closed valve, the buffer valve 2 can slow down the pressure shock wave generated by the release of the high-pressure gas and the violent impact of the central portion 112 against the valve seat 12 within a certain period of time. When the high-pressure gas is released in the pneumatic diaphragm valve 1 of the normally open valve, the buffer valve 2 can slow down the pressure shock wave generated by the release of the high-pressure gas and the instantaneous leaving speed of the central portion 112 from the valve seat 12 within a period of time, and can slow down the generation of local negative pressure and reduce the generation of intense eddy flow and intense turbulent flow. The period of time is preferably when the high-pressure gas is released, the buffer valve 2 is actuated immediately, and is actuated throughout the entire process. In the normally closed valve, the approach speed of the central portion 112 of the diaphragm 11 to the valve seat 12 is reduced throughout the entire process to reduce the impact. In the normally open valve, the leaving speed of the central portion 112 of the diaphragm 11 from the valve seat 12 is reduced throughout the entire process, which can reduce the generation of local negative pressure.

A gas connector 16 is installed on the buffer valve 2 for connecting to a high-pressure pipeline 161. The outside of the buffer valve 2 has a tool part. The tool part is used for installing or removing the buffer valve 2 and the gas connector 16.

Please refer to FIG. 2. An inner flow channel 22 of the buffer valve 2 includes an inner micro gas hole 221, an inner chamber 222, an outer gas hole 227, and a floating ball 23. The inner flow channel 22 is selectively in communication with the internal pneumatic chamber 14 or the gas connector 16 of an external high-pressure gas source.

The long cylindrical inner chamber 222 has an axis 223, an inner annular surface 224, an inner end 225, and an outer end 226. The inner micro gas hole 221 is installed on the inner end 225 and communicates with the pneumatic chamber 14. The inner micro gas hole 221 is disposed at a position deviating from the axis 223 of the inner chamber 222 and close to the inner annular surface 224. The outer gas hole 227 is disposed on the outer end 226 and located on the axis 223. The outer gas hole 227 is in communication with the gas connector 16. The floating ball 23 is disposed in the inner chamber 222 and floats along with the high-pressure gas flow. The floating ball 23 has an outer diameter d1 less than an inner diameter D2 of the inner chamber, d1<D2.

The buffer valve 2 has the following functions in operation, including a high-filling action 236, a shielding action 230, a releasing action 231, a shielding time Δt, an adjusting mechanism 28, and a releasing mechanism 24.

Please refer to FIG. 3A. The high-filling action 236 is that when the pneumatic chamber 14 is filled with the high-pressure gas, a gas flow 142 of the high-pressure gas enters the inner flow channel 22 through the outer gas hole 227 from the gas connector 16 and pushes the floating ball 23 to be at the inner end 225 of the inner chamber 222, without covering the inner micro gas hole 221, allowing the high-pressure gas to enter the pneumatic chamber 14 through the inner micro gas hole 221 to have the high-filling action 236.

Figure 3B:
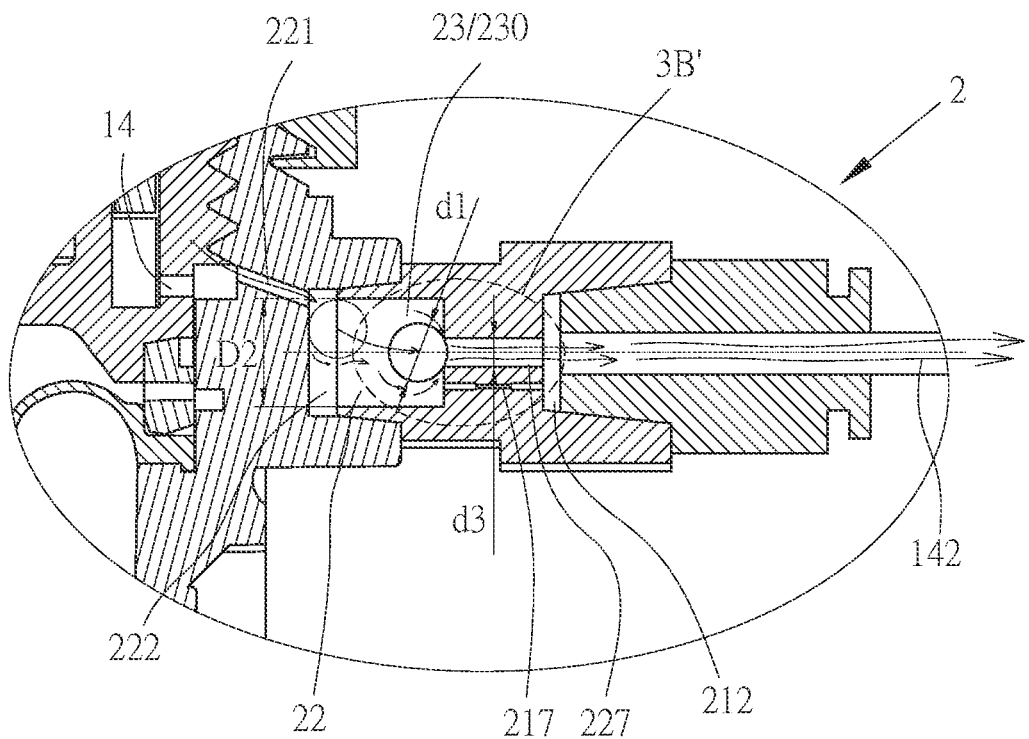
FIG. 3B is a schematic view illustrating the floating ball, the outer gas hole and the cone angle 2θ in the beginning of releasing the high-pressure gas.
Figure 3B:
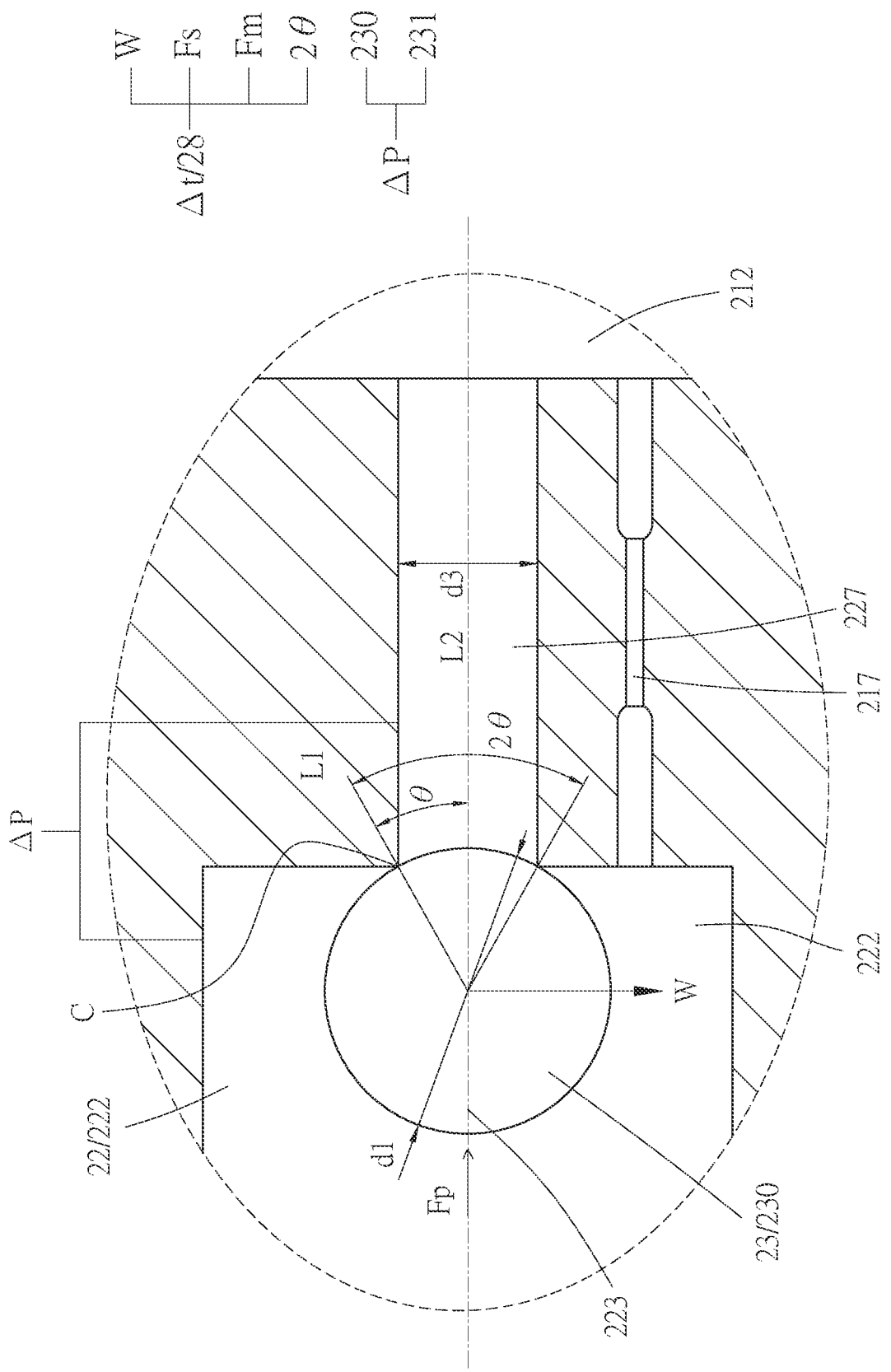

Please refer to FIG. 3B and FIG. 3B'. The shielding action 230 is that when the high-pressure gas is released from the pneumatic chamber 14, the high-pressure gas passes through the inner micro gas hole 221 to enter the inner flow channel 22, and drives the floating ball 23 to move to the outer gas hole 227 and generates the shielding action 230 to slow the release of high-pressure gas flow. The shielding action 230 is caused by the opening of the floating ball 23 and the inner diameter d3 of the outer gas hole 227 to form a circular contact line C without a sealing surface. The circular contact line C cannot achieve the effect of airtightness but reduces the speed of gas leakage.

Please refer to FIG. 3B'. A straight line L1 is defined from the circular contact line C to the center of the floating ball 23. A straight line L2 is defined from the center of the floating ball 23 to the center of the inner diameter d3 of the outer gas hole 227. The straight line L2 is approximately concentric with the axis 223. An included angle θ is defined between the straight line L1 and the straight line L2. That is, the center of the floating ball 23 is connected to the circular contact line C to form a cone angle 2θ, which is twice the included angle θ. The shielding action 230 is caused by a pressure difference ΔP between the gas pressure and the pipeline pressure to generate a pressing force Fp on the floating ball 23. The pressing force Fp is equal to the pressure difference ΔP multiplied by the circular area of the circular contact line C. The circular contact line C may be a narrow annular band structure without an airtight function. For example, the annular band structure forms a chamfer at the opening of the inner diameter d3 of the outer gas hole 227. When the outer diameter d1 of the floating ball 23 is less than the inner diameter d3 of the outer gas hole 227, d1<d3, the area of the circular contact line C is equal to the cross-sectional area of the outer diameter of the floating ball 23. At this time, the annular area of the unilateral gap is not greater than 50% of the cross-sectional area of the inner micro gas hole 221 to achieve slow degassing. In order to ensure the slow degassing, the outer end of the inner chamber 222 may also be provided with a micro gas hole 217 to communicate with the gas connector 16, and the cross-sectional area of the micro gas hole 217 is not greater than 50% of the cross-sectional area of the inner micro gas hole 221.

Figure 3C:
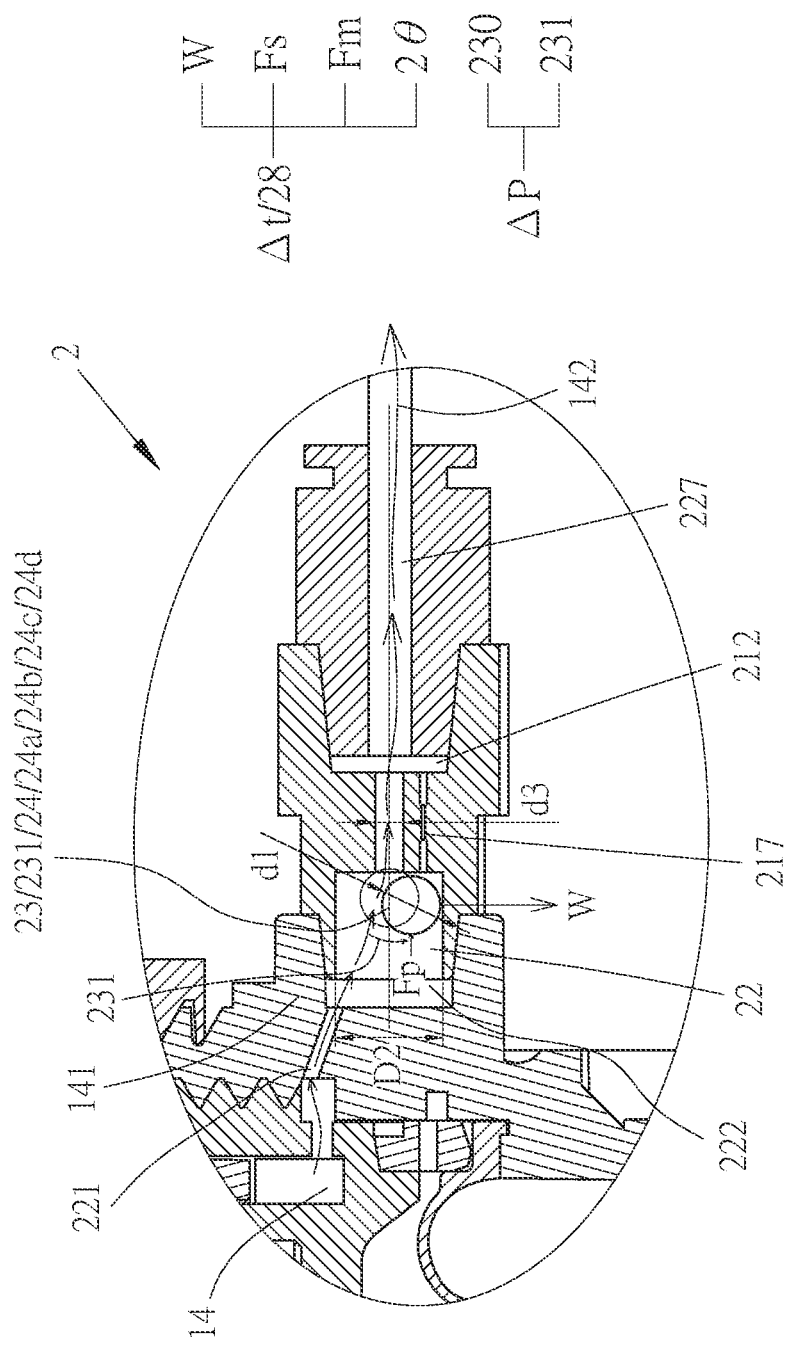
FIG. 3C is a schematic view illustrating the positions of the floating ball and the inner chamber at the end of releasing the high-pressure gas.

Please refer to FIG. 3B' and FIG. 3C. The releasing action 231 is that when the high-pressure gas is continuously released under the shielding action 230, the shielding action 230 is replaced by the releasing action 231 after the gas pressure is reduced and the pressure difference ΔP with the pipeline pressure is reduced for residual high-pressure gas to be discharged quickly. The releasing action 231 is to release the pressing force Fp through the releasing mechanism 24, so that the floating ball 23 is displaced and no longer shielded, and the residual high-pressure gas can be released quickly.

The releasing mechanism 24 refers to a mechanism using at least one of the weight W of the floating ball, an elastic force Fs and a magnetic force Fm to resist the pressing force Fp and move the floating ball 23 to complete the releasing action 231.

The shielding time Δt refers to the period from the generation of the shielding action 230 to the completion of the releasing action 231.

The adjusting mechanism 28 refers to that the length of the shielding time Δt is adjusted through the weight W, the elastic force Fs or the magnetic force Fm of the floating ball 23 of the releasing action 231.

The length of the shielding time Δt of the shielding action 230 is proportional to the pressing force Fp. The length of the shielding time Δt of the shielding action 230 is proportional to the size of the cone angle 2θ.

When the releasing mechanism 24 uses the weight W of the floating ball 23, it is called the releasing mechanism 24a. The shielding action 230 is that when the weight W of the floating ball 23 cannot resist the pressing force Fp, the floating ball 23 is secured to the outer gas hole 227. The releasing mechanism is that when the pressing force Fp generated by the pressure difference ΔP cannot resist the weight W of the floating ball 23, the floating ball 23 is displaced to the inner chamber 222 and no longer covers the outer gas hole 227.

When the releasing mechanism 24 uses the elastic force Fs, it is called the releasing mechanism 24b/24c. The shielding action 230 is that when the elastic force Fs borne by the floating ball 23 cannot resist the pressing force Fp, the floating ball 23 is secured to the outer gas hole 227. The releasing mechanism is that when the pressing force Fp generated by the pressure difference ΔP cannot resist the elastic force Fs borne by the floating ball 23, the floating ball 23 is displaced to the inner chamber 222 and no longer covers the outer gas hole 227.

When the releasing mechanism 24 uses the magnetic force Fm, it is called the releasing mechanism 24d. The shielding action 230 is that when the magnetic force Fm borne by the floating ball 23 cannot resist the pressing force Fp, the floating ball 23 is secured to the outer gas hole 227. The releasing mechanism is that when the pressing force Fp generated by the pressure difference ΔP cannot resist the magnetic force Fm borne by the floating ball 23, the floating ball 23 is displaced to the inner chamber 222 and no longer covers the outer gas hole 227.

For the normally open valve and the normally closed valve, during the high-speed filling action 236 of the high-pressure gas, the more the spring 151 in the spring chamber 15 is compressed, the higher the rebound force will be. Such a rebound force provides a good buffering effect, and there will not be too much impact. The pneumatic chamber 14 is subjected to a gradually rising pressure to reduce the vibration of the high-pressure gas.

Referring to FIG. 1, for a normally closed valve, the approach speed 115 of the central portion 112 is slowed down to reduce the impact against the valve seat 12, the jet flow generated by the water hammer effect is reduced, the transmission of pressure waves transmitted to the pipeline the upstream and downstream is reduced, and the service life of equipment or joints is prolonged to improve reliability. There will not be too many particles released to contaminate the clean fluid.

Referring to FIG. 1, for a normally open valve, the leaving speed 116 of the central portion 112 is slowed down to reduce the generation of short-term negative pressure vacuum and to reduce the short-term intense turbulent flow and eddy flow of the fluid.

First Embodiment

Please refer to FIG. 4. The buffer valve 2a includes a miniature valve body 21a, the breathing hole 141 and the floating ball 23 (the releasing mechanism 24a). The breathing hole 141 includes an inner accommodating chamber 143 and the inner micro gas hole 221. The miniature valve body 21a has a cylindrical shape, and includes the inner chamber 222, the outer gas hole 227, an outer chamber 212, a partition portion 213, an internal thread 216 and an external thread 215. The breathing hole 141 is disposed on the outer ring wall of the pneumatic chamber 14. The inner micro gas hole 221 is disposed at a position where the inner accommodating chamber 143 deviates from the axis 223 of the inner chamber 222 and is close to the inner annular surface 224 to communicate with the interior of the pneumatic chamber 14. The inner accommodating chamber 143 has the internal thread 216. The floating ball 23 is installed in the inner chamber 222. The long cylindrical inner chamber 222 has the axis 223, the inner annular surface 224, the inner end 225 and the outer end 226. The partition portion 213 is located in the middle of the miniature valve body 21a to separate the inner chamber 222 and the outer chamber 212 at two ends. The outer gas hole 227 is disposed on the partition portion 213 and located on the axis 223. The outer gas hole 227 communicates with the inner chamber 222 and the outer chamber 212. The outer ring surface of the inner chamber 222 has the external thread 215 which is coupled and sealed with the internal thread of the inner accommodating chamber 143 of the breathing hole 14. The outer chamber 212 has the internal thread 216 for installing the gas connector 16. The partition part 213 can also be provided with the micro gas hole 217, the micro gas hole 217 is connected to the inner chamber 222 and the outer chamber 212. The micro gas hole 217 is used to ensure the slow leakage of gas; specifically, the two opposite ends of the micro gas hole 217 communicating with the inner chamber 222 and the outer chamber 212 have a larger cross-sectional area and a smaller cross-sectional area at the middle section, for example, the cross-sectional area of the opposite ends of the micro gas hole 217 is twice the cross-sectional area of the middle section.

Second Embodiment

Please refer to FIG. 5. The buffer valve 2b is further evolved into an independent device. The buffer valve 2b includes a miniature valve body 21b, a breathing cover 20a and the floating ball 23 (the releasing mechanism 24a). The breathing cover 20a includes an inner accommodating chamber 202, the inner micro gas hole 221, and an external thread 203. The breathing cover 20a is configured to connect the breathing hole 141 of the pneumatic chamber 14. The inner micro gas hole 221 is disposed at a position away from the center of the bottom of the inner accommodating chamber 202 and communicates with the breathing hole 141. The inner accommodating chamber 202 has an internal thread to be coupled and sealed with the miniature valve body 21b. The miniature valve body 21b has a cylindrical shape, and includes the inner chamber 222, the outer gas hole 227, an outer chamber 212, a partition portion 213, an external thread 215 and an internal thread 216. The floating ball 23 is installed in the inner chamber 222. The long cylindrical inner chamber 222 has the axis 223, the inner annular surface 224, the inner end 225 and the outer end 226. The outer ring surface of the inner chamber 222 has the external thread 215 which is coupled and sealed with the internal thread of the inner accommodating chamber 202 of the breathing cover 20a. The partition portion 213 is located in the middle of the miniature valve body 21b to separate the inner chamber 222 and the outer chamber 212 at two ends. The outer gas hole 227 is disposed on the partition portion 213 and located on the axis 223. The outer gas hole 227 communicates with the inner chamber 222 and the outer chamber 212. The outer chamber 212 has the internal thread 216 for installing the gas connector 16.

As described in the first embodiment and the second embodiment shown in FIG. 4 and FIG. 5, in conjunction with FIG. 3B, FIG. 3B', and FIG. 3C, the shielding action 230 is that when the weight W of the floating ball 23 cannot resist the pressing force Fp generated by the pressure difference ΔP, the floating ball 23 is secured to the outer gas hole 227. When the outer diameter d1 of the floating ball 23 is greater than the outer diameter d3 of the outer gas hole 227, the cone angle 2θ, 10°≤θ≤60°. The releasing action 231 and the releasing mechanism 24a are that when the weight W of the floating ball 23 exceeds the pressing force Fp generated by the pressure difference ΔP, the floating ball 23 is displaced to the inner chamber 222 and no longer covers the outer gas hole 227. The releasing action 231 can be reliably completed due to the ratio of the outer diameter d1 of the floating ball 23 to the inner diameter D2 of the inner chamber 222, d1/D2≤0.6. The adjusting mechanism 28 is configured to adjust parameters such as the weight W and the outer diameter d1 of the floating ball 23 and the cone angle 2θ, where the cone angle 2θ, 10°≤θ≤60°.

Third Embodiment

Please refer to FIG. 6A, FIG. 6B, FIG. 6B", FIG. 6C and FIG. 6C'. The buffer valve 2c includes a miniature valve body 21c, the breathing hole 141, the floating ball 23, a releasing mechanism 24b, a retaining ring 25a, and an adapter 27. The breathing hole 141 includes an inner accommodating chamber 143 and the inner micro gas hole 221. The miniature valve body 21c has a cylindrical shape. The miniature valve body 21c includes the inner chamber 222, a connecting chamber 218, a partition portion 213, an outer gas hole 227, and an external thread 215. The breathing hole 141 is disposed on the outer ring wall of the pneumatic chamber 14. The inner micro gas hole 221 is disposed at a position where the inner accommodating chamber 143 deviates from the axis 223 of the inner chamber 222 and is close to the inner annular surface 224 to communicate with the interior of the pneumatic chamber 14. The inner accommodating chamber 143 has an internal thread. The long cylindrical inner chamber 222 has the axis 223, the inner annular surface 224, the inner end 225 and the outer end 226. The outer ring surface of the inner chamber 222 has the external thread 215 which is coupled and sealed with the internal thread of the inner accommodating chamber 143. The floating ball 23 is installed in the inner chamber 222 and floats along with the high-pressure gas flow. The outer diameter d1 of the floating ball 23 is less than the inner diameter D2 of the inner chamber 222, d1<D2. The partition portion 213 is located in the middle of the miniature valve body 21c to separate the inner chamber 222 and the connecting chamber 218 at two ends. The outer gas hole 227 is disposed on the partition portion 213 and located on the axis 223. The outer gas hole 227 communicates with the inner chamber 222 and the connecting chamber 218. The inner diameter of the connecting chamber 218 is greater than that of the inner chamber 222. The inner annular space of the connecting chamber 218 is a cylindrical space or a stepped cylindrical space with different diameters. The retaining ring 25a and the adapter 27 can be locked and sealed through screw threads or other fixing sealing methods. An open end of the adapter 27 installed in the connecting chamber 218 is fixed in a tight and sealing manner and is located outside the retaining ring 25a for connecting the gas connector 16 to deliver the high-pressure gas to the pneumatic chamber 14. The cylindrical retaining ring 25a includes a shaft hole 251, an outer ring surface 252, and at least one ventilation hole 253. The outer ring surface 252 has an external thread that can be engaged with an internal thread of the bottom of the connecting chamber 218 and pressed against the partition portion 213. The inner diameter of the shaft hole 251 is less than the inner diameter of the outer gas hole 227, and the ventilation hole 253 is not covered by the partition portion 213 and is in communication with the outer gas hole 227. The retaining ring 25a can be tightened by applying torque from the open end of the connecting chamber 218 to a groove or recess (not shown) using a tool. The outer ring surface 252 of the retaining ring 25a and the inner surface of the connecting chamber 218 may be smooth surfaces, and the two are coupled and slidably installed and secured to a sealing O-ring by a snap ring. The snap ring may be secured in the annular groove on the inner surface of the inner concave hole (not shown). The releasing mechanism 24b has an adjusting shaft 240, the retaining ring 25a, a retaining nut set 244, and a miniature spring 245. The adjusting shaft 240 includes an external thread 241, a ball seat 242, and a shaft 243. The disc-shaped ball seat 242 is located at one end of the adjusting shaft 240 and has a concave spherical surface. The external thread 241 is located at the other end of the adjusting shaft 240. The shaft 243 is located between the ball seat 242 and the external thread 241. The inner diameter of the outer gas hole 227 is greater than the outer diameter of the ball seat 242, so that the adjusting shaft 240 can move back and forth in the inner chamber 222 and the outer gas hole 227 freely.

In assembly, the retaining ring 25a is firstly locked inside the connecting chamber 218. The adjusting shaft 240 is inserted in the miniature spring 245 and its tail end passes through the outer gas hole 227 and the shaft hole 251 from the side of the inner chamber 222, so that the external thread 241 is located in the connecting chamber 218 to keep the ball seat 242 at the side of the inner chamber 222. The inner diameter d3 of the outer gas hole 227 is greater than the outer diameter of the ball seat 242, so that the adjusting shaft 240 can move back and forth in the inner chamber 222 and the outer gas hole 227 freely. The shaft 243 is in sliding fit with the shaft hole 251 to support the adjusting shaft 240. The outer diameter of the ball seat 242 is greater than the outer diameter of the shaft 243 and the outer diameter of the miniature spring 245, so that the shaft 243 is inserted into the miniature spring 245, and the miniature spring 245 is pressed between the ball seat 242 and the retaining ring 25a. The external thread 241 of the adjusting shaft 240 passing through the shaft hole 251 of the retaining ring 25a extends out of the shaft hole 251. The retaining nut set 244 is disposed on the external thread 241 to ensure that the adjusting shaft 240 will not be loosened from the retaining ring 25a when the high-pressure gas is filled.

Fourth Embodiment

Please refer to FIG. 7A, FIG. 7B, FIG. 7B', FIG. 7C and FIG. 7C'. The buffer valve 2d includes a miniature valve body 21d, the breathing hole 141, the floating ball 23, a releasing mechanism 24c, a retaining ring 25b, a slide sleeve 26, and an adapter 27. The miniature valve body 21d includes the inner chamber 222, a connecting chamber 218, the outer gas hole 227, a partition portion 213, and an external thread 215. The breathing hole 141 includes an inner accommodating chamber 143 and the inner micro gas hole 221. The breathing hole 141 is disposed on the outer ring wall of the pneumatic chamber 14. The inner micro gas hole 221 is disposed at a position where the inner accommodating chamber 143 deviates from the axis 223 of the inner chamber 222 and is close to the inner annular surface 224 to communicate with the interior of the pneumatic chamber 14. The inner accommodating chamber 143 has an internal thread. The long cylindrical inner chamber 222 has the axis 223, the inner annular surface 224, the inner end 225, and the outer end 226. The outer ring surface of the inner chamber 222 has the external thread 215 which is coupled and sealed with the internal thread of the inner accommodating chamber 143. The floating ball 23 is installed in the inner chamber 222 and floats along with the high-pressure gas flow. The outer diameter d1 of the floating ball 23 is less than the inner diameter D2 of the inner chamber 222, d1<D2. The partition portion 213 is located in the middle of the miniature valve body 21d to separate the inner chamber 222 and the connecting chamber 218 at two ends. The outer gas hole 227 is disposed on the partition portion 213 and located on the axis 223. The outer gas hole 227 communicates with the inner chamber 222 and the connecting chamber 218. The inner diameter of the connecting chamber 218 is greater than that of the inner chamber 222. The inner annular space of the connecting chamber 218 is a cylindrical space or a stepped cylindrical space with different diameters. The retaining ring 25a and the adapter 27 can be locked and sealed through screw threads or other fixing sealing methods. An open end of the adapter 27 installed in the connecting chamber 218 is fixed in a tight and sealing manner and is located outside the retaining ring 25b for connecting the gas connector 16 to deliver the high-pressure gas to the pneumatic chamber 14. The cylindrical retaining ring 25b includes a central screw hole 254, an outer ring surface 252, and at least one ventilation hole 253. The outer ring surface 252 has an external thread that can be engaged an internal thread of the bottom of the connecting chamber 218 and pressed against the partition portion 213. The inner diameter of the central screw hole 254 is less than the inner diameter of the outer gas hole 227, and the ventilation hole 253 is not covered by the partition portion 213 and is in communication with the outer gas hole 227. The retaining ring 25b can be tightened by applying torque from the open end of the connecting chamber 218 to a groove or recess (not shown) using a tool. The outer ring surface of the retaining ring 25b and the inner surface of the connecting chamber 218 may be smooth surfaces, and the two are coupled and slidably installed and secured to a sealing O-ring by a snap ring. The snap ring may be secured in the annular groove on the inner surface of the inner concave hole (not shown). The releasing mechanism 24c has an adjusting shaft 240, the slide sleeve 26, the retaining ring 25b, a locking nut 264, a retaining nut set 244, and a miniature spring 245. The slide sleeve 26 includes a slide shaft hole 261, an adjusting disc 262, and an external thread 263. The outer diameter of the outer thread 263 is greater than the outer diameter of the miniature spring 245 and is coupled and sealed with the central screw hole 254. The inner diameter of the outer gas hole 227 is greater than the outer diameter of the ball seat 242, so that the adjusting shaft 240 can move back and forth in the inner chamber 222 and the outer gas hole 227 freely.

In assembly, the retaining ring 25b is firstly locked inside the connecting chamber 218. The external thread 263 of the slide sleeve 26 is coupled and sealed with the central screw hole 254. The adjusting shaft 240 is inserted in the miniature spring 245 and its tail end passes through the outer gas hole 227 and the slide shaft hole 251 from the side of the inner chamber 222, so that the external thread 241 is located in the connecting chamber 218 to keep the ball seat 242 at the side of the inner chamber 222. The outer diameter of the ball seat 242 is less than the inner diameter of the outer gas hole 227. The shaft 243 is in sliding fit with the slide shaft hole 261 to support the adjusting shaft 240. The outer diameter of the ball seat 242 is greater than the outer diameter of the shaft 243 and the outer diameter of the miniature spring 245, so that the shaft 243 is inserted into the miniature spring 245, and the miniature spring 245 is pressed between the ball seat 242 and the slide sleeve 26. The external thread 241 of the adjusting shaft 240 passing through the slide shaft hole 261 extends out of the slide shaft hole 261. The retaining nut set 244 is disposed on the external thread 241 to ensure that the adjusting shaft 240 will not be loosened from the slide sleeve 26 when the high-pressure gas is filled. The adjusting disc 262 of the slide sleeve 26 can be rotated to move forward or rearward and can be secured by the locking nut 264. The position of the miniature spring 245 is linked with the position of the slide sleeve 26 to change a compression displacement $\Delta X$. The position of the slide sleeve 26 is adjusted to fine-tune the compression displacement $\Delta X$ of the miniature spring 245 to change the elastic force Fs. Therefore, when the value of the elastic coefficient K of the miniature spring 245 is fixed and the outer diameter d1 and weight W of the floating ball are also fixed, the elastic force Fs can be changed to adjust the length of the shielding time $\Delta t$.

As described in the third embodiment and the fourth embodiment, the shielding action 230 is that when the high-pressure gas is released from the pneumatic chamber 14, the floating ball 23 will be attached to the ball seat 242. When the floating ball 23 completes the shielding action, a circular contact line C is formed between the floating ball and the entrance of the outer gas hole 227. The shielding action 230 is caused by a pressing force Fp generated by the pressure difference $\Delta P$ between the gas pressure and the pipeline pressure. The pressing force Fp acts on the floating ball 23 and pushes the miniature spring 245 back through the ball seat 242 to generate the compression displacement $\Delta X$. The compression displacement $\Delta X$ is the compression amount of the miniature spring 245, and the miniature spring 245 generates the elastic force Fs, Fp Fs. The circular contact line C does not form a sealing surface and cannot achieve the effect of airtightness, but reduces the speed of gas leakage. When the outer diameter d1 of the floating ball 23 is greater than the inner diameter d3 of the outer gas hole, the cone angle $2\theta$ is defined between the circular contact line C generated by the shielding action 230 and the center of the floating ball 23, $15° \leq \theta \leq 80°$. When the outer diameter d1 of the floating ball 23 is less than the inner diameter d3 of the outer gas hole 227, the annular area of the gap between the outer diameter d1 and the inner diameter d3 is not greater than 50% of the cross-sectional area of the inner micro gas hole 221 to achieve slow degassing (not shown).

Please refer to FIG. 6B', FIG. 6C', FIG. 7B', FIG. 7C'. The releasing action 231 is that when the pressing force Fp generated by the pressure difference $\Delta P$ cannot resist the elastic force Fs of the miniature spring 245, Fp≤Fs, the floating ball 23 is pushed away and moved to the inner chamber 222 without covering the outer gas hole 227, so that the residual high-pressure gas can be released quickly. The elastic force Fs is equal to the product of the compression displacement $\Delta X$ and the elastic coefficient K. The releasing action 231 can be reliably completed due to the ratio of the outer diameter d1 of the floating ball 23 to the inner diameter D2 of the inner chamber 222, $d1/D2 \leq 0.8$.

In the adjusting mechanism 28, the shielding time $\Delta t$ can be determined by the weight W and the outer diameter d1 of the floating ball 23 and the elastic force Fs of the miniature spring 245. The position of the slide sleeve 26 is adjusted to fine-tune the compression displacement $\Delta X$ of the miniature spring 245 to change the elastic force Fs. Adjusting the position of the slide sleeve 26 is equivalent to adjusting the magnitude of the compression displacement $\Delta X$ and the magnitude of the elastic force Fs. Therefore, when the value of the elastic coefficient K of the miniature spring 245 is fixed and the outer diameter d1 and weight W of the floating ball are also fixed, the elastic force Fs can be changed to adjust the length of the shielding time $\Delta t$.

In the first and second embodiments, when the direction in which the floating ball 23 bears the weight W is consistent with the direction of the pressing force Fp, the floating ball 23 will not deviate from the outer gas hole 227 and cannot discharge the residual gas quickly. The releasing mechanism 24b/24c/24d of the third embodiment, the fourth embodiment or the fifth embodiment described later can solve such a restriction, that is, when the direction in which the floating ball 23 bears the weight W is consistent with the direction of the pressing force Fp, the floating ball 23 will not deviate from the outer gas hole 227 and cannot discharge the residual gas quickly. The weight W of the floating ball, the elastic force Fs, the magnetic force Fm and the pressing force Fp of the releasing mechanism have no direction restrictions. In the third embodiment, the retaining nut set 244 can be tightly locked on the retaining ring 25a, and a pre-compression is applied to the miniature spring 245, so that the adjusting shaft 240 is in a stable state and is not affected by the high-speed filling gas. In the fourth embodiment, the retaining nut set 244 can be tightly locked on the adjusting disc 262 of the slide sleeve 26, and a pre-compression is applied to the miniature spring 245, so that the adjusting shaft 240 is in a stable state and is not affected by the high-speed filling gas. The pre-compression can be used to adjust the elastic force Fs of the miniature spring 245.

Fifth Embodiment

Please refer to FIG. 8A. The buffer valve 2e is an independent device. The buffer valve 2e includes a miniature valve body 21e, a breathing cover 20b, and a floating ball 23a. The miniature valve body 21e has a cylindrical shape, and includes the inner chamber 222, an outer chamber 212, a partition portion 213, the outer gas hole 227, and a magnetic member 219. The outer chamber 212 is configured to mount the gas connector 16. The long cylindrical inner chamber 222 has the axis 223, the inner annular surface 224, the inner end 225 and the outer end 226. The breathing cover 20b is configured to connect the breathing hole 141, and includes an inner micro gas hole 221, an inner accommodating chamber 202, an external thread 203, and a central post 204. The external thread 203 of the breathing cover 20b is coupled and sealed with the breathing hole 141. The outer ring surface of the miniature valve body 2e is coupled and sealed with the inner accommodating chamber 202 of the breathing cover 20b. The inner micro gas hole 221 is deviated from the axis 223 of the inner accommodating chamber 202 and is located at the inner end 225 close to the inner annular surface 224 to communicate with the breathing hole 141. The central post 204 of the breathing cover 20b is mounted at the center of the bottom of the inner accommodating chamber 202 and is concentric with the axis 223 to extend in the inner chamber 222. The floating ball 23a has a cylindrical shape, and includes a spherical curved surface 232 at its front end and a cylinder 233 at its rear end. The cylinder 233 has a cylindrical blind hole 234. A magnetic ring 235 is installed inside the floating ball 23a. The magnetic ring 235 is a long ring and is installed near the spherical curved surface 232. The axis 223 extends to pass through the center of the spherical curved surface 232 and the center of the magnetic ring 235 and is concentric with the blind hole 234. The partition portion 213 is located in the middle of the miniature valve body 21e to separate the inner chamber 222 and the outer chamber 212 at two ends. The outer gas hole 227 is disposed on the partition portion 213 and located on the axis 223 to communicate with the inner chamber 222 and the outer chamber 212. The magnetic member 219 is annular and is mounted on the side of the partition portion 213 close to the inner chamber 222 and is concentric with the outer gas hole 227. The floating ball 23a is housed in the inner chamber 222 and can move back and forth on the central post 204. A mutually repulsive magnetic force Fm is generated between the magnetic ring 235 of the floating ball 23a and the magnetic member 219 of the miniature valve body 21e. The floating ball 23a moves along with the gas flow in the inner chamber 222. The outer diameter d1 of the floating ball 23 is less than the inner diameter D2 of the inner chamber 222, d1<D2.

In the high filling action 236, when the pneumatic chamber 14 is filled with high-pressure gas, the gas flow 142 of the high-pressure gas will enter the inner flow channel 22 through the outer gas hole 227 from the high-pressure pipeline 161, and push the floating ball 23a to the inner end 225 of the inner chamber 222 without covering the inner micro gas hole 221, keeping the high-pressure gas entering the pneumatic chamber through the inner micro gas hole 221 to have the high filling action 236.

When the high-pressure gas is released, the floating ball 23a can perform the shielding action 230 on the outer gas hole 227. The shielding action 230 is that when the high-pressure gas is released from the pneumatic chamber 14, the floating ball 23 will be attached to the outer gas hole 227. When the floating ball 23 completes the shielding action 230, a circular contact line C is formed between the floating ball and the entrance of the outer gas hole 227.

The shielding action 230 is that when the magnetic force Fm mutually repelling the magnetic ring 235 of the floating ball 23a and the magnetic member 219 of the miniature valve body 21e cannot resist the pressing force Fp generated by the pressure difference ΔP, Fm<Fp, the floating ball 23a is secured to the outer gas hole 227.

When the outer diameter d1 of the floating ball 23a is greater than the inner diameter d3 of the outer gas hole, the cone angle 2θ is defined between the circular contact line C generated by the shielding action 230 and the center of the floating ball 23, 15°≤θ≤80°.

When the outer diameter d1 of the floating ball 23 is less than the inner diameter d3 of the outer gas hole 227, the annular area of the gap between the outer diameter d1 and the inner diameter d3 is not greater than 50% of the cross-sectional area of the inner micro gas hole 221 to achieve slow degassing (not shown).

When the pressure of the high-pressure gas decreases, the repulsive magnetic force Fm that the floating ball 23a bears overcomes the pressing force Fp to complete the releasing action 231. The releasing mechanism is that when the pressing force Fp generated by the pressure difference ΔP cannot resist the magnetic force Fm of the magnetic ring and the magnetic member, Fm>Fp, the floating ball is displaced backward to the inner chamber and no longer covers the outer gas hole.

The releasing mechanism 24d is not restricted by the direction of the weight W of the floating ball and the direction of the pressing force Fp.

The releasing action 231 can be reliably completed due to the ratio of the outer diameter d1 of the floating ball 23a to the inner diameter D2 of the inner chamber 222, d1/D2≤0.8.

In the adjusting mechanism 28, the shielding time Δt can be determined by the weight W and the outer diameter d1 of the floating ball 23 and the mutually repulsive magnetic force Fm. The adjusting mechanism 28 of the magnetic force Fm refers to adjusting the mutual repulsive force between the magnetic ring 235 and the magnetic member 219 of the miniature valve body.

The above embodiments all solve problem 1, problem 2, problem 3, problem 4 and problem 5, and also fully meet requirement 1, requirement 2, requirement 3 and requirement 4, and meet the unique requirements for delivering clean fluid and particle suspension fluid.

What is claimed is:

1. A buffer valve, being a two-way valve, the buffer valve being installed on a pneumatic diaphragm valve, the pneumatic diaphragm valve including a pneumatic cylinder, a diaphragm and a valve seat, the pneumatic cylinder being divided into a pneumatic chamber and a spring chamber by a piston, a spring being disposed in the spring chamber, the pneumatic chamber and the spring chamber each having a breathing hole, the breathing hole of the pneumatic chamber having an inner accommodating chamber, the buffer valve being mounted to the inner accommodating chamber, the buffer valve being provided with a gas connector for filling a high-pressure gas, the buffer valve being configured to adjust a flow rate of the breathing hole, the buffer valve being used for adjusting release of the high-pressure gas in the pneumatic chamber without affecting a filling speed of the high-pressure gas in the pneumatic chamber, a tool part being disposed on an outside of the buffer valve for mounting or demounting the buffer valve and for mounting the gas connector; the diaphragm being an integral structure and having a circumferential portion, a central portion and an elastic portion, the elastic portion having a Q-shaped cross section with an arc-shaped curve; characterized in that: in the process from an open state to a closed state for a normally closed valve and in the process from the closed state to the open state for a normally open valve, when the high-pressure gas is released, the buffer valve can slow down a pressure shock wave generated by the release of the high-pressure gas within a period of time, and the compressed spring in the spring chamber is restricted to slowly release its elastic force during expansion; an approach speed of the central portion of the diaphragm of the normally closed valve toward the valve seat is reduced to reduce impact and to reduce jet flow generated by the valve seat when it is closed; an instantaneous leaving speed of the central portion of the diaphragm of the normally open valve away from the valve seat is reduced to slow down generation of local negative pressure and reduce generation of eddy flow and turbulent flow; an inner flow channel of the buffer valve includes an inner gas hole, an inner chamber, an outer gas hole, and a floating ball; the inner flow channel is selectively in communication with the internal pneumatic chamber or the gas connector of an external high-pressure gas source; the inner chamber has an axis, an inner annular surface, an inner end and an outer end, the inner end communicates with the pneumatic chamber through the inner micro gas hole, the inner gas hole is disposed at a position deviating from the axis of the inner chamber and close proximate to the inner annular surface, the outer end of the inner chamber communicates with the gas connector through the outer gas hole, the outer end of the inner chamber has a gas hole communicating with the gas connector, the cross-sectional area of the gas hole is not greater than 50% of the cross-sectional area of the inner gas hole, so as to achieve slow degassing, the outer gas hole is located on the axis of the inner chamber, and the floating ball is disposed in the inner chamber and floats along with the high-pressure gas, the floating ball having an outer diameter d1 less than an inner diameter D2 of the inner chamber, d1<D2; the buffer valve has the following functions in operation, including a high-filling action, a shielding action, a releasing action, including a releasing mechanism, a shielding time $\Delta t$, and an adjusting mechanism; the high-filling action is that when the pneumatic chamber is filled with the high-pressure gas, the high-pressure gas enters the inner chamber through the outer gas hole from a high-pressure pipeline and pushes the floating ball to move toward the inner gas hole, without covering the inner gas hole, allowing the high-pressure gas to enter the pneumatic chamber to have the high-filling action; the shielding action is that when the high-pressure gas is released from the pneumatic chamber, the high-pressure gas passes through the inner gas hole to enter the inner chamber and drives the floating ball to move toward the outer gas hole to cover the outer gas hole to slow down the release of high-pressure gas; the shielding action is caused by an opening of the floating ball and an inner diameter d3 of the outer gas hole to form a circular contact line C, the circular contact line C cannot achieve an airtightness effect but reduces the speed of gas leakage; the shielding action is caused by a pressure difference $\Delta P$ between a gas pressure and a pipeline pressure to generate a pressing force Fp on the floating ball, the pressing force Fp is equal to the pressure difference $\Delta P$ multiplied by a circular area of the circular contact line C; the releasing action is that when the high-pressure gas is continuously released under the shielding action, after the gas pressure is reduced, the releasing action is to release the pressing force Fp through the releasing mechanism, so that the floating ball is displaced and no longer covers the outer gas hole, and the residual high-pressure gas is discharged quickly; the releasing mechanism is a mechanism using at least one of a weight W of the floating ball, an elastic force Fs and a magnetic force Fm to resist the pressing force Fp and move the floating ball to complete the releasing action; the shielding time $\Delta t$ is a period from the generation of the shielding action to the completion of the releasing action; the adjusting mechanism is that the length of the shielding time $\Delta t$ is adjusted through the releasing mechanism of the releasing action.

2. The buffer valve as claimed in claim 1, wherein a center of the floating ball is connected to the circular contact line to form a cone angle $2\theta$.

3. The buffer valve as claimed in claim 1, wherein the circular contact line is an annular band structure.

4. The buffer valve as claimed in claim 1, wherein when the outer diameter d1 of the floating ball is less than the inner diameter d3 of the outer gas hole, d1<d3, the area of the circular contact line C is equal to the cross-sectional area of the outer diameter of the floating ball, the annular area of a gap between the outer diameter d1 and the inner diameter d3 is not greater than 50% of the cross-sectional area of the inner micro gas hole to achieve slow degassing.

5. The buffer valve as claimed in claim 1, wherein the length of the shielding time $\Delta t$ of the shielding action is proportional to the pressing force Fp; the length of the shielding time $\Delta t$ of the shielding action is proportional to the size of the cone angle $2\theta$.

6. The buffer valve as claimed in claim 1, wherein when the releasing mechanism uses the weight W of the floating ball, the shielding action is that when the weight W of the floating ball cannot resist the pressing force Fp, the floating ball is secured to the outer gas hole, and the releasing mechanism is that when the pressing force Fp generated by the pressure difference $\Delta P$ cannot resist the weight W of the floating ball, the floating ball is displaced to the inner chamber and no longer covers the outer gas hole.

7. The buffer valve as claimed in claim 1, wherein when the releasing mechanism uses the elastic force Fs, the shielding action is that when the elastic force Fs borne by the floating ball cannot resist the pressing force Fp, the floating ball is secured to the outer gas hole, and the releasing mechanism is that when the pressing force Fp generated by the pressure difference $\Delta P$ cannot resist the elastic force Fs borne by the floating ball, the floating ball is displaced to the inner chamber and no longer covers the outer gas hole.

8. The buffer valve as claimed in claim 1, wherein when the releasing mechanism uses the magnetic force Fm, the shielding action is that when the magnetic force Fm borne by the floating ball cannot resist the pressing force Fp, the floating ball is secured to the outer gas hole, and the releasing mechanism is that when the pressing force Fp generated by the pressure difference $\Delta P$ cannot resist the magnetic force Fm borne by the floating ball, the floating ball is displaced to the inner chamber and no longer covers the outer gas hole.

9. The buffer valve as claimed in claim 1, wherein the buffer valve includes a miniature valve body, the breathing hole and the floating ball; the miniature valve body has a cylindrical shape and includes the inner chamber, an outer chamber, a partition portion, and the outer gas hole; the breathing hole includes an inner accommodating chamber and the inner gas hole, the breathing hole is disposed on an outer ring wall of the pneumatic chamber, the inner gas hole is disposed at a position where the inner accommodating chamber deviates from the axis of the inner chamber and is proximate to the inner annular surface, an outer ring surface of the miniature valve body is coupled and sealed with the inner accommodating chamber of the breathing hole; the outer chamber is configured to install the gas connector; the partition portion is located in the middle of the miniature valve body to separate the inner chamber and the outer chamber at two ends, the partition portion has the outer gas hole to communicate with the inner chamber and the outer chamber, and the outer gas hole is located on the axis; the shielding action is that when the weight W of the floating ball cannot resist the pressing force Fp, the floating ball is secured to the outer gas hole; the releasing mechanism is that when the weight W of the floating ball exceeds the pressing force Fp generated by the pressure difference $\Delta P$, the floating ball is displaced to the inner chamber and no longer covers the outer gas hole; the releasing action is reliably completed due to the ratio of the outer diameter d1 of the floating ball to the inner diameter D2 of the inner chamber, $d1/D2 \leq 0.6$; the outer diameter d1 of the floating ball is greater than the outer diameter d3 of the outer gas hole, and the cone angle $2\theta$, $10° \leq \theta \leq 60°$; wherein the adjusting mechanism is configured to adjust parameters including the weight W and the outer diameter d1 of the floating ball and the cone angle $2\theta$.

10. The buffer valve as claimed in claim 1, wherein the buffer valve includes a miniature valve body, a breathing cover and the floating ball; the miniature valve body has a cylindrical shape and includes the inner chamber, an outer chamber, a partition portion, and the outer gas hole; the breathing cover is configured to connect the breathing hole and includes an inner accommodating chamber, the inner gas hole, and an external thread; an external thread of the breathing cover is coupled and sealed with the breathing hole; the inner gas hole is located on the breathing cover at a position where the inner accommodating chamber deviates from the axis of the inner chamber and is proximate to the inner annular surface to communicate with the breathing hole; an outer ring surface of the miniature valve body is coupled and sealed with the inner accommodating chamber of the breathing cover; the outer chamber is configured to install the gas connector; the partition portion is located in the middle of the miniature valve body to separate the inner chamber and the outer chamber at two ends, the partition portion has the outer gas hole to communicate with the inner chamber and the outer chamber, and the outer gas hole is located on the axis; the shielding action is that when the weight W of the floating ball cannot resist the pressing force Fp, the floating ball is secured to the outer gas hole; the releasing mechanism is that when the weight W of the floating ball exceeds the pressing force Fp generated by the pressure difference $\Delta P$, the floating ball is displaced to the inner chamber and no longer covers the outer gas hole; releasing action is reliably completed due to the ratio of the outer diameter d1 of the floating ball to the inner diameter D2 of the inner chamber, $d1/D2 \leq 0.6$; the outer diameter d1 of the floating ball is greater than the outer diameter d3 of the outer gas hole, and the cone angle $2\theta$, $10° \leq \theta \leq 60°$; wherein the adjusting mechanism is configured to adjust parameters including the weight W and the outer diameter d1 of the floating ball and the cone angle $2\theta$.

11. The buffer valve as claimed in claim 1, wherein the buffer valve includes a valve body, the breathing hole, the floating ball, a releasing mechanism, a retaining ring, and an adapter; the valve body has a cylindrical shape and includes the inner chamber, a connecting chamber, a partition portion, and the outer gas hole; the breathing hole includes the inner accommodating chamber and the inner gas hole, the breathing hole is disposed on an outer ring wall of the pneumatic chamber; an outer ring surface of the valve body is coupled and sealed with the inner accommodating chamber of the breathing hole; the inner gas hole is disposed at a position where the inner accommodating chamber deviates from the axis of the inner chamber and is proximate to the inner annular surface; the partition portion is disposed between the inner chamber and the connecting chamber, the partition portion has the outer gas hole to communicate with the connecting chamber and the inner chamber, the outer gas hole is located on the axis; an inner diameter of the connecting chamber is greater than that of the inner chamber, the retaining ring and the adapter are secured in an airtightness manner; the adapter is installed at an open end of the connecting chamber and is located outside the retaining ring, the adapter is configured to connect the gas connector and the high-pressure pipeline and communicates with the pneumatic chamber; the retaining ring has a cylindrical shape and includes a shaft hole and at least one ventilation hole, the retaining ring is secured to a bottom of the connecting chamber and pressed against the partition portion, the shaft hole has an inner diameter less than that of the outer gas hole, the ventilation hole is in communication with the outer gas hole; the releasing mechanism includes an adjusting shaft, the retaining ring, a retaining nut set, and a spring; the adjusting shaft includes an external thread, a ball seat and a shaft, the disc-shaped ball seat is located at one end of the adjusting shaft and has a concave spherical surface, the external thread is located at another end of the adjusting shaft; in assembly, the retaining ring is firstly locked inside the connecting chamber, the adjusting shaft is inserted in the spring with its tail end passing through the outer gas hole and the shaft hole from the side of the inner chamber, so that the external thread is located in the connecting chamber to keep the ball seat at the side of the inner chamber, the spring is sleeved on the shaft and pressed between the ball seat and the retaining ring; the inner diameter of the outer gas hole is greater than an outer diameter of the ball seat, so that the adjusting shaft can move back and forth in the inner chamber and the outer gas hole freely; the shaft is in sliding fit with the shaft hole to support the adjusting shaft; the external thread of the adjusting shaft extends out of the shaft hole, the retaining nut set is disposed on the external thread to ensure that the adjusting shaft will not be loosened from the retaining ring when the high-pressure gas is filled; the shielding action is that when the high-pressure gas brings the floating ball to be attached to the ball seat, a pressing force Fp generated by the pressure difference $\Delta P$ generated by the high-pressure gas is applied to the floating ball, the spring is pushed back by the ball seat to generate a compression displacement $\Delta X$ and the elastic force Fs, the compression displacement $\Delta X$ is the compression amount of the spring, $Fp \geq Fs$; the releasing action is that when the pressing force Fp generated by the pressure difference $\Delta P$ cannot resist the elastic force Fs of the spring, $Fp \leq Fs$, the floating ball is pushed away and moved to the inner chamber without covering the outer gas hole; the releasing mechanism is not restricted by the direction of the weight W of the floating ball and the direction of the pressing force Fp; the releasing mechanism is reliably completed due to the ratio of the outer diameter d1 of the floating ball to the inner diameter D2 of the inner chamber, d1/D2≤0.8; the outer diameter d1 of the floating ball is greater than the inner diameter d3 of the outer gas hole, the cone angle 2θ, 15°≤θ≤80°; the adjusting mechanism, the shielding time Δt is adjusted by the weight W and the outer diameter d1 of the floating ball and the elastic force Fs of the spring, and the adjustment of the elastic force Fs refers to adjusting the elastic coefficient of the spring; the adjusting mechanism includes the retaining nut set, the relative position of the ball seat of the adjusting shaft relative to an opening of the outer gas hole at the side of the inner chamber can be set to ensure that the floating ball can indeed complete the shielding action and the releasing action.

12. The buffer valve as claimed in claim 1, wherein the buffer valve includes a valve body, the breathing hole, the floating ball, a releasing mechanism, a retaining ring, a slide sleeve, and an adapter; the valve body has a cylindrical shape and includes the inner chamber, a connecting chamber, a partition portion, and the outer gas hole; the breathing hole includes an inner accommodating chamber and the inner gas hole, the breathing hole is disposed on an outer ring wall of the pneumatic chamber; an outer ring surface of the valve body is coupled and sealed with the inner accommodating chamber of the breathing hole; the inner gas hole is disposed at a position where the inner accommodating chamber deviates from the axis of the inner chamber and is proximate to the inner annular surface; the partition portion is disposed between the inner chamber and the connecting chamber, the partition portion has the outer gas hole to communicate with the outer chamber and the connecting chamber, the outer gas hole is located on the axis; an inner diameter of the connecting chamber is greater than that of the inner chamber, the retaining ring and the adapter are secured in an airtightness manner; the adapter is installed at an open end of the connecting chamber and is located outside the retaining ring, the adapter is configured to connect the gas connector and the high-pressure pipeline and communicates with the pneumatic chamber; the retaining ring has a cylindrical shape and includes at least one ventilation hole and a central screw hole, the retaining ring is secured to a bottom of the connecting chamber and pressed against the partition portion, the central screw hole has an inner diameter less than that of the outer gas hole, the ventilation hole is in communication with the outer gas hole; the releasing mechanism has an adjusting shaft, the slide sleeve, the retaining ring, a locking nut, the retaining nut set, and a spring; the adjusting shaft includes an external thread, a ball seat and a shaft, the disc-shaped ball seat is located at one end of the adjusting shaft and has a concave spherical surface, the external thread is located at another end of the adjusting shaft; the slide sleeve includes a slide shaft hole, an adjusting disc, and an external thread; in assembly, the retaining ring is firstly locked inside the connecting chamber, the locking nut is fitted on the external thread of the slide sleeve and screwed to the position of the adjusting disc, the external thread of the slide sleeve is coupled with the central screw hole of the retaining ring, the adjusting shaft is inserted in the spring with its tail end to passthrough the outer gas hole and the slide shaft hole from the side of the inner chamber, so that the external thread is located in the connecting chamber to keep the ball seat at the side of the inner chamber, an outer diameter of the external thread of the slide sleeve is greater than an outer diameter of the spring, the spring is sleeved on the shaft and pressed between the ball seat and the slide sleeve; the inner diameter of the outer gas hole is greater than an outer diameter of the ball seat, so that the adjusting shaft can move back and forth in the inner chamber and the outer gas hole freely; the shaft is in sliding fit with the slide shaft hole to support the adjusting shaft; the adjusting disc of the slide sleeve is rotated to move forward or rearward and is secured by the locking nut, the position of the spring is linked with the position of the slide sleeve to change a compression displacement ΔX; the external thread of the adjusting shaft extends out of the slide shaft hole of the slide sleeve, the retaining nut set is disposed on the external thread to ensure that the adjusting shaft will not be loosened from the slide sleeve when the high-pressure gas is filled; the position of the slide sleeve is adjusted to fine-tune the compression displacement ΔX of the spring to change the elastic force Fs, when the value of the elastic coefficient K of the spring is fixed and the outer diameter d1 and weight W of the floating ball are also fixed, the elastic force Fs can be changed to adjust the length of the shielding time Δt; the shielding action is that when the high-pressure gas brings the floating ball to be attached to the ball seat, a pressing force Fp generated by the pressure difference ΔP generated by the high-pressure gas is applied to the floating ball, the spring is pushed back by the ball seat to generate a compression displacement ΔX and the elastic force Fs, the compression displacement ΔX is the compression amount of the spring, Fp≥Fs; the releasing action is that when the pressing force Fp generated by the pressure difference ΔP cannot resist the elastic force Fs of the spring, Fp≥Fs, the floating ball is pushed away and moved to the inner chamber without covering the outer gas hole; the releasing mechanism is not restricted by the direction of the weight W of the floating ball and the direction of the pressing force Fp; the releasing mechanism is reliably completed due to the ratio of the outer diameter d1 of the floating ball to the inner diameter D2 of the inner chamber, d1/D2≥0.8; the outer diameter d1 of the floating ball is greater than the inner diameter d3 of the outer gas hole, the cone angle 2θ, 15°≤θ≤80°; the adjusting mechanism, the shielding time Δt is adjusted by the weight W and the outer diameter d1 of the floating ball and the elastic force Fs of the spring, and the adjustment of the elastic force Fs refers to adjusting the elastic coefficient of the spring; the adjusting mechanism includes the retaining nut set, the relative position of the ball seat of the adjusting shaft relative to an opening of the outer gas hole at the side of the inner chamber can be set to ensure that the floating ball can indeed complete the shielding action and the releasing action.

13. The buffer valve as claimed in claim 1, wherein the buffer valve includes a valve body, a breathing cover and a floating ball; the valve body has a cylindrical shape and includes the inner chamber, an outer chamber, a partition portion, the outer gas hole, and a magnetic member; the outer chamber is configured to mount the gas connector; the breathing cover is configured to connect the breathing hole and includes an inner accommodating chamber, the inner gas hole, an external thread, and a central post; the external thread of the breathing cover is coupled and sealed with the breathing hole; an outer ring surface of the valve body is coupled and sealed with the inner accommodating chamber of the breathing cover; the central post of the breathing cover is mounted at a central position of a bottom of the inner accommodating chamber and is concentric with the axis to extend in the inner chamber; the inner gas hole is deviated from the axis of the inner accommodating chamber and is located at the inner end proximate to the inner annular surface to communicate with the breathing hole; the floating ball has a cylindrical shape and includes a spherical curved surface at its front end and a cylinder at its rear end, the cylinder has a cylindrical blind hole, a magnetic ring is installed inside the floating ball, the magnetic ring is a long ring located near the spherical curved surface, the axis extends to pass through the center of the spherical curved surface and the center of the magnetic ring and is concentric with the blind hole; the partition portion is located in the middle of the valve body to separate the inner chamber and the outer chamber at two ends, the inner chamber and the outer chamber are in communication with each other through the outer gas hole, the outer gas hole is located on the axis; the magnetic member is annular and is mounted on one side of the partition portion proximate to the inner chamber and is concentric with the outer gas hole; the floating ball is disposed in the inner chamber and can move back and forth on the central post; a mutually repulsive magnetic force Fm is generated between the magnetic ring of the floating ball and the magnetic member of the valve body; the shielding action is that when the magnetic force Fm mutually repelling the magnetic ring of the floating ball and the magnetic member of the valve body cannot resist the pressing force Fp generated by the pressure difference ΔP, Fm<Fp, the floating ball is secured to the outer gas hole; the releasing mechanism is that when the pressing force Fp generated by the pressure difference ΔP cannot resist the magnetic force Fm mutually repelling the magnetic ring and the magnetic member, Fm>Fp, the floating ball is displaced backward to the inner chamber and no longer covers the outer gas hole.

14. The buffer valve as claimed in claim 13, wherein the releasing mechanism is not restricted by the direction of the weight W of the floating ball and the direction of the pressing force Fp.

15. The buffer valve as claimed in claim 13, wherein the releasing action is reliably completed due to the ratio of the outer diameter d1 of the floating ball to the inner diameter D2 of the inner chamber, d1/D2≤0.9.

16. The buffer valve as claimed in claim 13, wherein when the outer diameter d1 of the floating ball is greater than the inner diameter d3 of the outer gas hole, the cone angle 2θ, 10°≤θ≤80°.

17. The buffer valve as claimed in claim 13, wherein in the adjusting mechanism, the shielding time Δt is adjusted by the outer diameter d1 and the magnetic force Fm, the adjusting mechanism of the magnetic force Fm refers to adjusting a mutual repulsive force between the magnetic ring and the magnetic member of the valve.

18. The buffer valve as claimed in claim 1, wherein the weight W of the floating ball, the elastic force Fs, the magnetic force Fm and the pressing force Fp of the releasing mechanism have no direction restrictions.

19. The buffer valve as claimed in claim 1, wherein in the process from the open state to the closed state for the normally closed valve and in the process from the closed state to the open state for the normally open valve, when the high-pressure gas is released, the buffer valve is actuated immediately, the approach speed of the central portion of the diaphragm the normally closed valve to the valve seat is reduced immediately, and the leaving speed of the central portion of the diaphragm of the normally open valve from the valve seat is reduced immediately.

20. The buffer valve as claimed in claim 19, wherein in the process from the open state to the closed state for the normally closed valve and in the process from the closed state to the open state for the normally open valve, the period of time is that when the high-pressure gas is released, the shielding time Δt of the buffer valve is to slow down the pressure shock wave generated by the release of the high-pressure gas in the whole process: the approach speed of the central portion of the diaphragm of the normally closed valve toward the valve seat is reduced in the whole process to reduce impact and to reduce jet flow generated by the valve seat when it is closed: the leaving speed of the central portion of the diaphragm of the normally open valve away from the valve seat is reduced in the whole process to slow down generation of local negative pressure and reduce generation of eddy flow and turbulent flow.

* * * * *